US012600180B2

(12) United States Patent (10) Patent No.: US 12,600,180 B2
Bill et al. (45) Date of Patent: Apr. 14, 2026

(54) METHOD OF CONFIGURING A NETWORK OF TIRE MONITORING DEVICES

(71) Applicants: AIRBUS OPERATIONS LIMITED, Bristol (GB); AIRBUS OPERATIONS GmbH, Hamburg (DE); AIRBUS OPERATIONS (S.A.S.), Toulouse (FR); MEGGITT SA, Villars-sur-Glâne (CH); AIRBUS DEFENCE AND SPACE GmbH, Taufkirchen (DE)

(72) Inventors: Andrew Bill, Bristol (GB); Stephan Marwedel, Hamburg (DE); Christelle Duchossoy, Toulouse (FR); Erik-Oliver Blass, Taufkirchen (DE); Kevin Stanley-Adams, Villars-sur-Glâne (CH)

(73) Assignees: AIRBUS OPERATIONS LIMITED, Bristol (GB); AIRBUS OPERATIONS GmbH, Hamburg (DE); AIRBUS OPERATIONS (S.A.S.), Toulouse (FR); MEGGITT SA, Villars-sur-Glâne (CH); AIRBUS DEFENCE AND SPACE GmbH, Taufkirchen (DE)

( * ) Notice: Subject to any disclaimer, the term of this patent is extended or adjusted under 35 U.S.C. 154(b) by 452 days.

(21) Appl. No.: 18/128,285

(22) Filed: Mar. 30, 2023

(65) Prior Publication Data

US 2023/0311593 A1 Oct. 5, 2023

(30) Foreign Application Priority Data

Mar. 30, 2022 (EP) .................................... 22305398

(51) Int. Cl.
B60C 23/04 (2006.01)
H04L 9/40 (2022.01)
H04L 67/12 (2022.01)

(52) U.S. Cl.
CPC ...... B60C 23/0479 (2013.01); H04L 63/0428 (2013.01); H04L 67/12 (2013.01)

(58) Field of Classification Search
CPC ............ B60C 23/0479; B60C 23/0471; B60C 23/0472; B60C 23/0483; B60C 23/0438;
(Continued)

(56) References Cited

U.S. PATENT DOCUMENTS 8,599,044 B2 12/2013 Maggiore et al.
10,630,477 B1 4/2020 Ju et al.
(Continued)

FOREIGN PATENT DOCUMENTS

CN 106994869 B 8/2017
CN 110832825 A 2/2020
(Continued)

OTHER PUBLICATIONS

Extended European Search Report for EP 22305399.2, dated Sep. 19, 2022, 7 pages.
(Continued)

*Primary Examiner* — Manuel A Rivera Vargas
(74) *Attorney, Agent, or Firm* — Nixon & Vanderhye, PC

(57) ABSTRACT

A method of configuring a network of tire monitoring devices using an untrusted device is provided. An untrusted device transmits first configuration data to a first tire monitoring device, and then receives a first input verifying that the first configuration data has been loaded to the first tire monitoring device and matches expected first configuration data. The untrusted device transmits second configuration data to a second tire monitoring device, and receives a second input verifying that the second configuration data has been loaded to the second tire monitoring device and matches expected second configuration data. The untrusted device transmits a command initializing generation of a (Continued)

cryptographic parameter by the first tire monitoring device, and causes the cryptographic parameter to be exchanged with the second tire monitoring device such that secure future communication is established between the first and second tire monitoring devices.

19 Claims, 16 Drawing Sheets

(58) Field of Classification Search
CPC .. B60C 2200/02; H04L 63/0428; H04L 67/12
See application file for complete search history.

(56) References Cited

U.S. PATENT DOCUMENTS

| | | | | |
|---|---|---|---|---|
| 11,273,676 | B2 * | 3/2022 | McIntyre | H04W 84/18 |
| 12,162,316 | B2 * | 12/2024 | Bill | B60C 23/0437 |
| 2004/0189457 | A1 * | 9/2004 | Watabe | B60C 23/0442 |
| | | | | 340/445 |
| 2012/0023891 | A1 | 2/2012 | Agrawal et al. | |
| 2013/0311033 | A1 * | 11/2013 | Patel | B60C 23/0462 |
| | | | | 701/29.4 |
| 2015/0029015 | A1 * | 1/2015 | Pierce | B60C 23/00372 |
| | | | | 340/442 |
| 2016/0272020 | A1 | 9/2016 | Bill | |
| 2017/0015151 | A1 | 1/2017 | Bill | |
| 2017/0346623 | A1 | 11/2017 | Bill et al. | |
| 2018/0094996 | A1 * | 4/2018 | Yu | B60C 23/0455 |
| 2018/0323975 | A1 | 11/2018 | Curbera et al. | |
| 2019/0050855 | A1 | 2/2019 | Martino et al. | |
| 2019/0179806 | A1 | 6/2019 | Reinsberg et al. | |
| 2020/0162264 | A1 | 5/2020 | Zamani et al. | |
| 2020/0313885 | A1 | 10/2020 | Mondello et al. | |
| 2021/0021429 | A1 | 1/2021 | Truu et al. | |
| 2021/0023891 | A1 * | 1/2021 | Bill | B60C 23/20 |
| 2021/0107323 | A1 * | 4/2021 | Bill | B60C 23/0474 |
| 2021/0136157 | A1 | 5/2021 | Kauppila et al. | |
| 2021/0178838 | A1 | 6/2021 | McIntyre et al. | |
| 2021/0184864 | A1 | 6/2021 | Wentz et al. | |
| 2021/0344510 | A1 | 11/2021 | Wright et al. | |
| 2021/0406893 | A1 | 12/2021 | Calvert et al. | |
| 2022/0105758 | A1 * | 4/2022 | Bill | B60C 23/0481 |
| 2022/0174045 | A1 | 6/2022 | El-Moussa | |
| 2022/0311623 | A1 | 9/2022 | Tomlinson et al. | |

FOREIGN PATENT DOCUMENTS

| | | |
|---|---|---|
| CN | 113472790 A | 10/2021 |
| CN | 114117470 A | 3/2022 |
| GB | 2584850 | 12/2020 |
| WO | 2015/194932 | 12/2015 |
| WO | 2017/179968 | 10/2017 |
| WO | 2020/254280 | 12/2020 |

OTHER PUBLICATIONS

Extended European Search Report for EP 22305398.4, dated Sep. 15, 2022, 6 pages.

European Patent Application 23164949.2, Extended European Search Report (Aug. 1, 2023)(5 pages).

Micciancio, Daniele. "Commitment Schemes". CSE 206A: Lattice Algorithms and Applications, Fall 2019, 4 pages (Year: 2019).

Office Action for U.S. Appl. No. 18/128,131, 13 pages, dated Jun. 30, 2025.

Office Action for U.S. Appl. No. 18/128,131, 17 pages, dated Oct. 20, 2025.

* cited by examiner

100

104          102          104

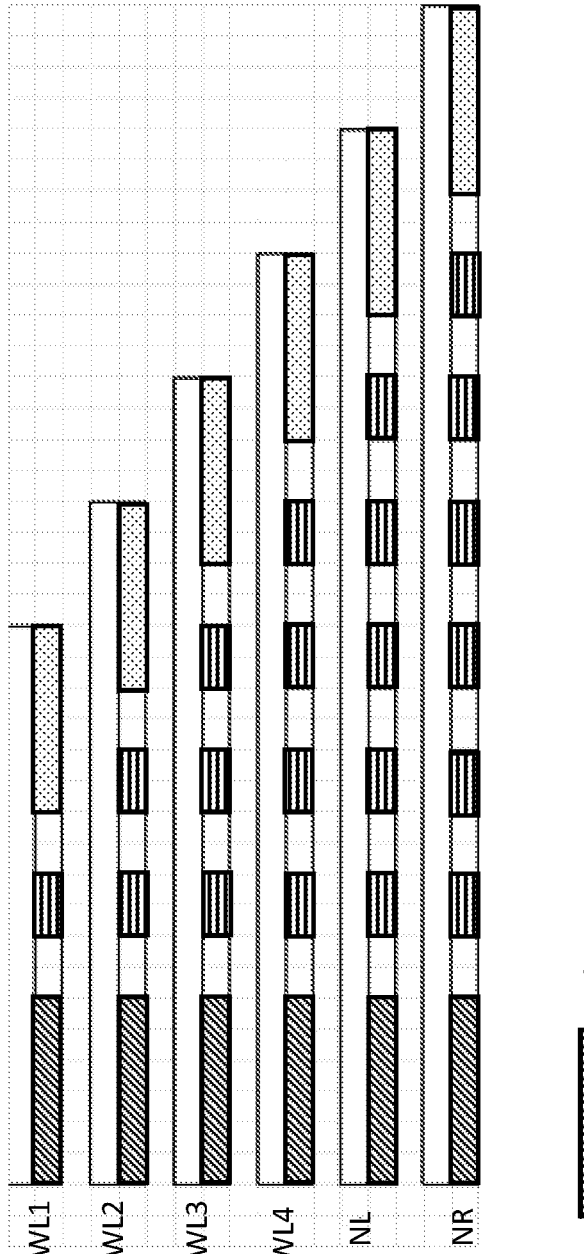
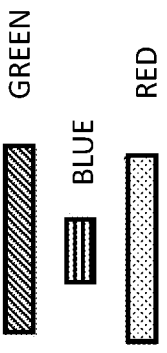
Fig. 4

50

54

PSD POSITION CHECK NL

PLEASE REFER TO TASK CARD IN AMM

GO

52

PSD POSITION CHECK NL

DID YOU OBSERVE THE CORRECT FLASH SEQUENCE?

YES

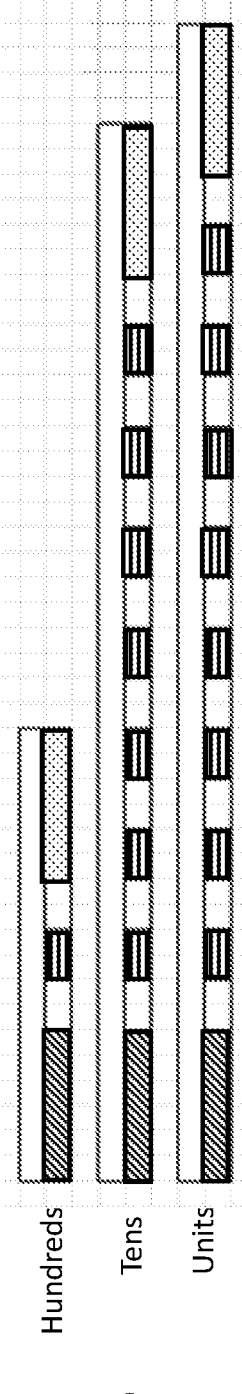
Hundreds
Tens
Units
Fig. 6
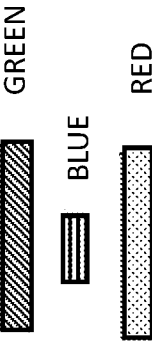
GREEN
BLUE
RED

PSD REFERENCE
PRESSURE CHECK – NL

PLEASE REFER TO TASK
CARD IN AMM
[HUNDREDS]

GO 60                62

PSD REFERENCE
PRESSURE CHECK – NL

DID YOU OBSERVE THE
CORRECT FLASH
SEQUENCE?

64

YES        NO

66    Fig. 7B     68

PSD REFERENCE
PRESSURE CHECK – NL

PLEASE REFER TO TASK
CARD IN AMM
[TENS]

GO 70              72

PSD REFERENCE
PRESSURE CHECK – NL

DID YOU OBSERVE THE
CORRECT FLASH
SEQUENCE?

74

YES        NO

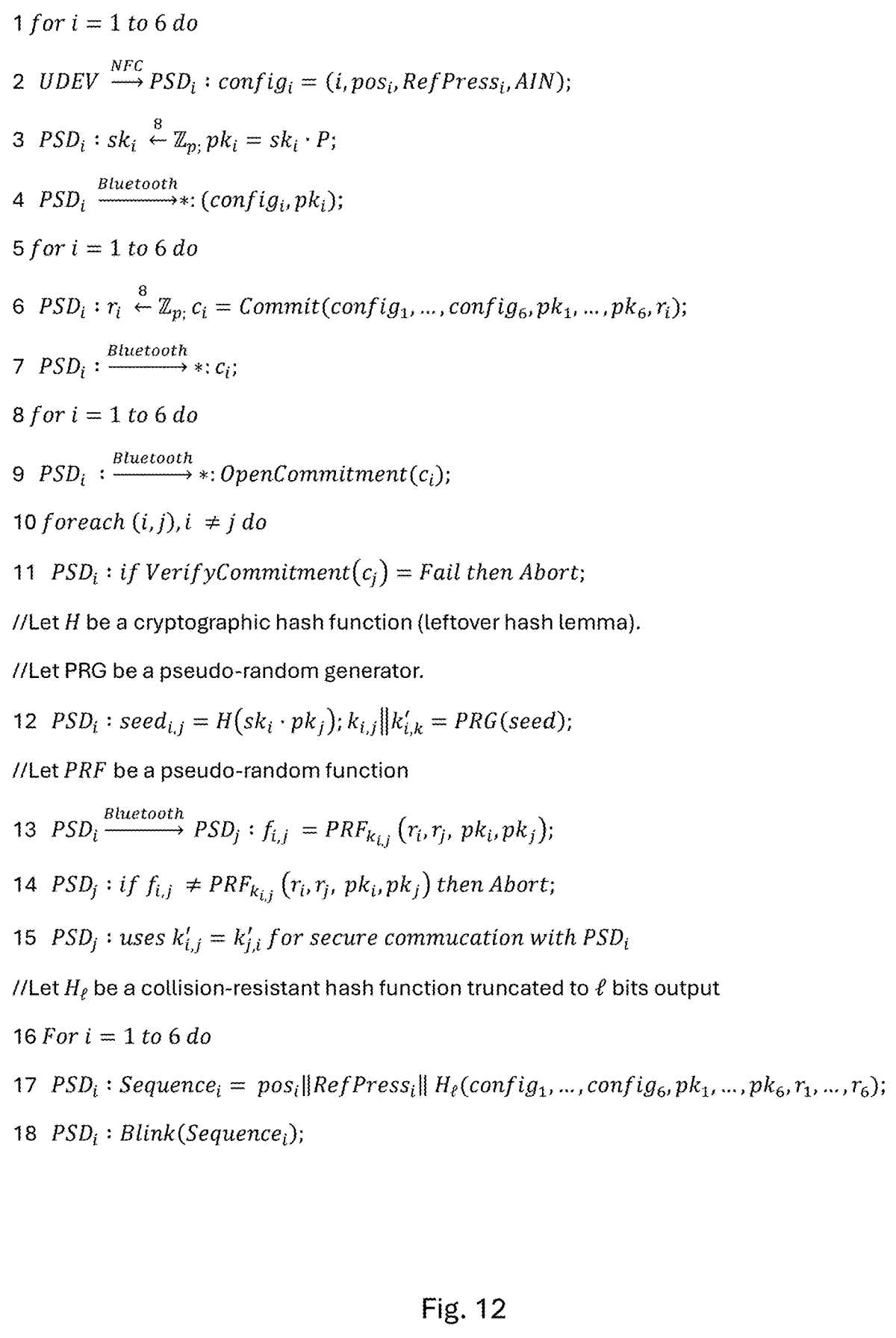

1 $for\ i = 1\ to\ 6\ do$

2 $UDEV \xrightarrow{NFC} PSD_i : config_i = (i, pos_i, RefPress_i, AIN);$

3 $PSD_i : sk_i \xleftarrow{\$} \mathbb{Z}_p; pk_i = sk_i \cdot P;$

4 $PSD_i \xrightarrow{Bluetooth} *: (config_i, pk_i);$

5 $for\ i = 1\ to\ 6\ do$

6 $PSD_i : r_i \xleftarrow{\$} \mathbb{Z}_p; c_i = Commit(config_1, \ldots, config_6, pk_1, \ldots, pk_6, r_i);$ 7 $PSD_i : \xrightarrow{Bluetooth} *: c_i;$ 8 $for\ i = 1\ to\ 6\ do$ 9 $PSD_i : \xrightarrow{Bluetooth} *: OpenCommitment(c_i);$ 10 $foreach\ (i, j), i \neq j\ do$ 11 $PSD_i : if\ VerifyCommitment(c_j) = Fail\ then\ Abort;$ //Let $H$ be a cryptographic hash function (leftover hash lemma).

//Let PRG be a pseudo-random generator.

12 $PSD_i : seed_{i,j} = H(sk_i \cdot pk_j); k_{i,j} \| k'_{i,k} = PRG(seed);$

//Let $PRF$ be a pseudo-random function

13 $PSD_i \xrightarrow{Bluetooth} PSD_j : f_{i,j} = PRF_{k_{i,j}}(r_i, r_j, pk_i, pk_j);$ 14 $PSD_j : if\ f_{i,j} \neq PRF_{k_{i,j}}(r_i, r_j, pk_i, pk_j)\ then\ Abort;$ 15 $PSD_j : uses\ k'_{i,j} = k'_{j,i}\ for\ secure\ commucation\ with\ PSD_i$ //Let $H_\ell$ be a collision-resistant hash function truncated to $\ell$ bits output 16 $For\ i = 1\ to\ 6\ do$ 17 $PSD_i : Sequence_i = pos_i \| RefPress_i \| H_\ell(config_1, \ldots, config_6, pk_1, \ldots, pk_6, r_1, \ldots, r_6);$ 18 $PSD_i : Blink(Sequence_i);$

Fig. 12

Figure 13:
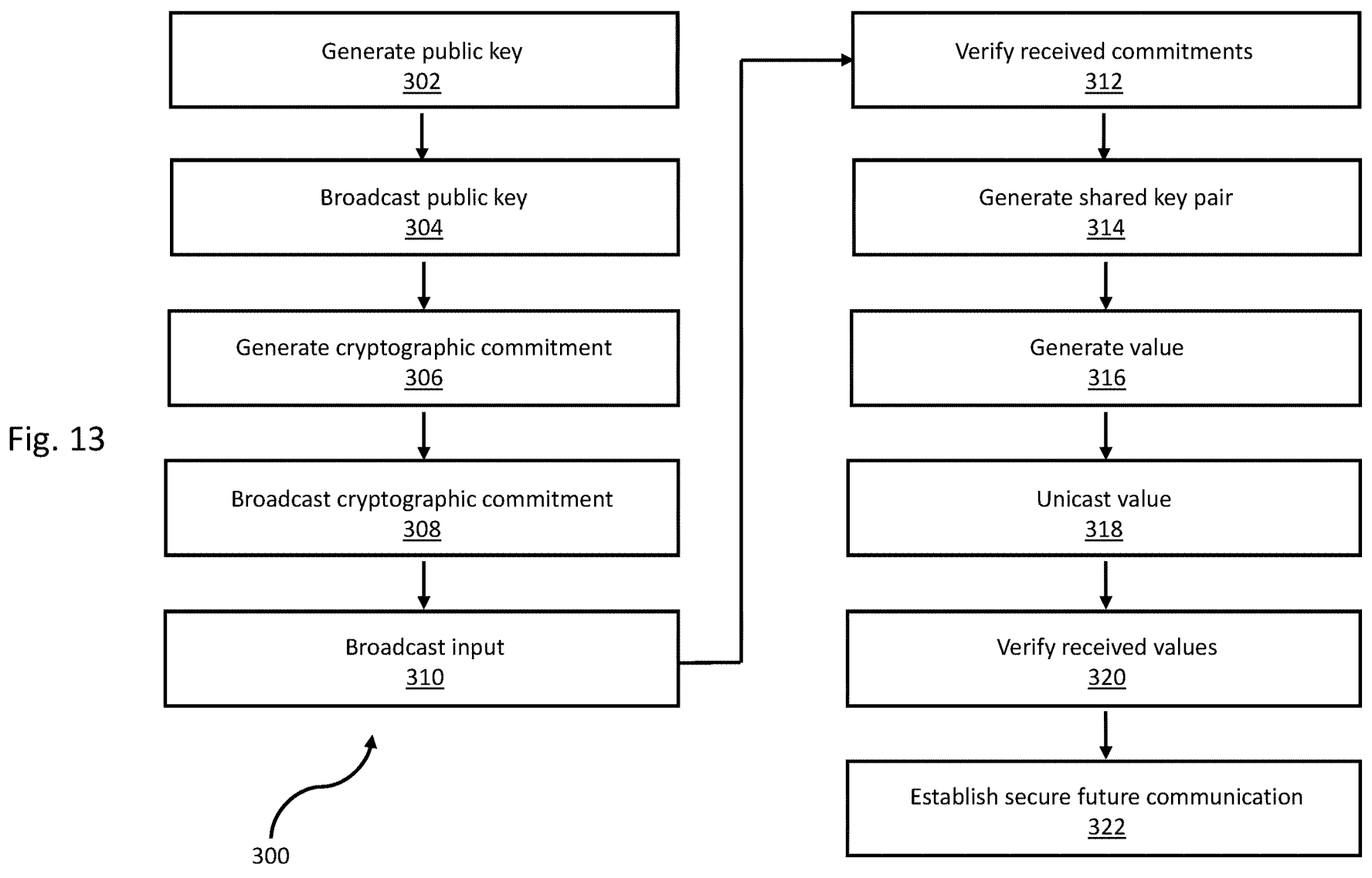

| Verify received commitments 312 | Generate shared key pair 314 | Generate value 316 | Unicast value 318 | Verify received values 320 | Establish secure future communication 322 |

| Generate public key 302 | Broadcast public key 304 | Generate cryptographic commitment 306 | Broadcast cryptographic commitment 308 | Broadcast input 310 |

METHOD OF CONFIGURING A NETWORK OF TIRE MONITORING DEVICES

This application claims priority to EP 22305398.4 filed Mar. 30, 2022, the entire contents of which are hereby incorporated by reference.

TECHNICAL FIELD

The present invention relates to tire pressure monitoring devices.

BACKGROUND

Checking tire pressure is an important part of the maintenance of a vehicle. Tire pressures should be maintained at predetermined pressures to ensure that a tire performs as intended by the manufacturer.

SUMMARY

A first aspect of the present invention provides a method of configuring a network of tire monitoring devices using an untrusted device, the method comprising: transmitting, by the untrusted device, first configuration data to a first tire monitoring device; receiving, by the untrusted device, a first input verifying that the first configuration data has been loaded to the first tire monitoring device and matches expected first configuration data; transmitting, by the untrusted device, second configuration data to a second tire monitoring device; receiving, by the untrusted device, a second input verifying that the second configuration data has been loaded to the second tire monitoring device and matches expected second configuration data; and after receipt of both the first input and the second input, transmitting, by the untrusted device, a command initialising generation of a cryptographic parameter by the first tire monitoring device, and causing the cryptographic parameter to be exchanged with the second tire monitoring device such that secure future communication is established between the first and second tire monitoring devices.

The method according to the first aspect of the present invention may be advantageous as it may enable the first and second tire monitoring devices to be loaded with respective configuration data and verified sequentially prior to initialisation of generation of the cryptographic parameter by the first tire monitoring device. This may facilitate configuration of the network of tire monitoring devices as it may ensure that the first and second configuration data is properly loaded in the first and second tire monitoring devices prior to the cryptographic parameter being generated. For example, this may find particular utility where the cryptographic parameter is based, at least in part, on any of the first and second configuration data. Furthermore, the method allows the first and second tire monitoring devices to establish secure communication between themselves without the untrusted device subsequently knowing the parameters of the secure communication, so the untrusted device cannot later eavesdrop or pose a risk to the secure communication.

The method according to the first aspect of the present invention may further facilitate configuration of the network of tire monitoring devices, as the sequential loading and verification of configuration data at the first and second tire monitoring devices may provide a relatively simple and efficient method for an operator performing the method utilising the untrusted device. For example, as the first configuration data is transmitted and subsequently verified prior to the second configuration data being transmitted and subsequently verified, the operator may be able to perform steps required for configuring the first tire monitoring device prior to performing steps required for configuring the second tire monitoring device. This may, for example, find particular utility where the tire monitoring devices are installed on respective tires of an aircraft, for example enabling a single circuit of the aircraft to be performed by an operator in order for the configuration of the network of tire monitoring devices to take place.

In general, a cryptographic parameter, may be anything used for cryptography, including but not limited to cryptographic commitments and keys (symmetrical and asymmetric). In an example, the cryptographic parameter comprises a cryptographic commitment generated by the respective tire monitoring device.

The network of tire monitoring devices may comprise a wireless network of tire monitoring devices.

Optionally, the method comprises, when the first input is not received, and prior to transmitting, by the untrusted device, the second configuration data to the second tire monitoring device, re-attempting verification of the first configuration data, and indicating a fault condition if the first input continues not to be received.

This may facilitate configuration of the network of tire monitoring devices by an operator utilising the untrusted device, as the operator may be able to ensure that the first configuration data has been loaded correctly prior to attempting to load the second configuration data. This may, for example, find particular utility where the tire monitoring devices are installed on respective tires of an aircraft, for example enabling a single circuit of the aircraft to be performed by an operator in order for the configuration of the network of tire monitoring devices to take place.

Optionally, the method comprises, when the first input continues not to be received after re-attempting verification of the first configuration data, re-transmitting, by the untrusted device, the first configuration data to the first tire monitoring device, re-attempting verification of the first configuration data after the re-transmitting, and indicating a further fault condition if the first input still continues not to be received.

This may facilitate configuration of the network of tire monitoring devices by an operator utilising the untrusted device, as the operator may be able to ensure that the first configuration data has been loaded correctly prior to attempting to load the second configuration data. This may, for example, find particular utility where the tire monitoring devices are installed on respective tires of an aircraft, for example enabling a single circuit of the aircraft to be performed by an operator in order for the configuration of the network of tire monitoring devices to take place.

Optionally, the first and/or second configuration data comprises any of an aircraft wheel location at which the tire monitoring device is intended to be located, and a reference pressure for a tire of a wheel to which the tire monitoring device corresponds.

Optionally, verifying that the first configuration data loaded to the first tire monitoring device matches expected first configuration data comprises transmitting, by the first tire monitoring device, a configuration data signal which encodes the first configuration data, wherein the configuration data signal is configured to be received and understood by a human, and receiving, by the untrusted device, the first input via a human interaction with the untrusted device.

Optionally, the configuration data signal is transmitted in response to a transmission request sent by the untrusted device.

Optionally, the configuration data signal comprises a visual signal, and the visual signal is transmitted using a visual indicator of the first tire monitoring device.

Optionally, the visual indicator comprises a light source, and the method comprises selectively illuminating the light source to transmit the configuration data signal.

Optionally, the configuration data signal comprises a number, and the selective illumination of the light source comprises encoding the number into an illumination sequence representing individual digits of the number.

Optionally, verifying that the second configuration data loaded to the second tire monitoring device matches expected second configuration data comprises transmitting, by the second tire monitoring device, a further configuration data signal which encodes the second configuration data, wherein the further configuration data signal is configured to be received and understood by a human, and receiving, by the untrusted device, the second input via a human interaction with the untrusted device. Optionally, the further configuration data signal is transmitted in response to a further transmission request sent by the untrusted device.

Optionally, the further configuration data signal comprises a visual signal, and the visual signal is transmitted using a visual indicator of the second tire monitoring device.

Optionally, the visual indicator comprises a light source, and the method comprises selectively illuminating the light source to transmit the further configuration data signal.

Optionally, the further configuration data signal comprises a number, and the selective illumination of the light source comprises encoding the number into an illumination sequence representing individual digits of the number.

Optionally, the method comprises receiving, at the untrusted device, the first configuration data prior to transmitting the first configuration data to the first tire monitoring device. For example, an operator of the untrusted device, who may comprise a trusted source, may input the first configuration data into the untrusted device prior to transmitting the first configuration data to the first tire monitoring device.

Optionally, the method comprises transmitting, via the untrusted device, a further command waking the first tire monitoring device prior to transmission of the first configuration data to the first tire monitoring device.

Optionally, the command is transmitted using a relatively long-range communication protocol, and the further command is transmitted using a relatively short-range communication protocol. This may be beneficial as the command may be transmitted to the first tire monitoring device from a location remote from the first tire monitoring device, whilst the further command may be transmitted from a region in close proximity to the device. This may enable the operator of the untrusted device to initiate the method of configuring the network of tire monitoring devices at the first tire monitoring device, whilst finishing the method of configuring the network of tire monitoring devices at a location remote from the first tire monitoring device. This may, for example, find particular utility where the tire monitoring devices are installed on respective tires of an aircraft, for example enabling a single circuit of the aircraft to be performed by an operator in order for the configuration of the network of tire monitoring devices to take place.

The command may be transmitted via a communication protocol having a maximum transmission range of 100 m, 75 m, 50 m, or less, whilst the further command may be transmitted via a communication protocol having a maximum transmission range of 30 cm, 20 cm, 10 cm, 5 cm, 1 cm, or less. The command may be transmitted via Bluetooth® and/or the further command may be transmitted via any of near-field communication (NFC). The further command may be transmitted in response to scanning, using the untrusted device, of a QR code or barcode on the first tire monitoring device.

Optionally, the command comprises a plurality of commands. For example, the command may comprise a first command initialising generation of a cryptographic parameter by the first tire monitoring device, and a second causing the cryptographic parameter to be exchanged with the second tire monitoring device.

Optionally the command initialises generation of a cryptographic parameter by the first tire monitoring device and a further cryptographic parameter by the second tire monitoring device, and causes the cryptographic parameter and the further cryptographic parameter to be exchanged between the first and second tire monitoring devices such that secure future communication is established between the first and second tire monitoring devices. Optionally, the command is broadcast from the untrusted device to each of the first and second tire monitoring devices. Optionally, the command is unicast from the untrusted device to the respective first and second tire monitoring devices.

Optionally, the method comprises transmitting, via the untrusted device, a second further command waking the second tire monitoring device prior to transmission of the second configuration data to the second tire monitoring device.

Optionally, the second further command is transmitted using the relatively short-range communication protocol.

Optionally, the method comprises initiating, via the untrusted device, a tire check once secure future communication is established between the first and second tire monitoring devices. Optionally, the tire check may be initiated via transmission of a tire check request from the untrusted device to the first tire monitoring device, for example using the relatively long-range communication protocol.

Optionally, the method comprises transmitting, by the untrusted device, third configuration data to a third tire monitoring device, receiving, by the untrusted device, a third input verifying that the third configuration data has been loaded to the third tire monitoring device and matches expected third configuration data, and after receipt of the first, second and third inputs, transmitting, by the untrusted device, the command initialising generation of the cryptographic parameter by the first tire monitoring device, and causing the cryptographic parameter to be exchanged with the second and third tire monitoring devices such that secure future communication is established between the first, second and third tire monitoring devices.

Optionally the tire monitoring devices comprise tire pressure monitoring devices.

Optionally, the method comprises, where verifying that the first configuration data loaded to the first tire monitoring device matches expected first configuration data fails, and/or where verifying that the second configuration data loaded to the second tire monitoring device matches expected second configuration data fails, any of: re-attempting verification of the respective first and/or second configuration data; re-transmitting the first and/or second configuration data to the respective first and second tire monitoring device; and indicating a fault condition.

According to a second aspect of the present invention there is provided a method of configuring a network of tire pressure monitoring devices using an untrusted device, the method comprising: transmitting, by the untrusted device, respective configuration data to the tire pressure monitoring devices; receiving, by the untrusted device, respective inputs verifying that the installed configuration data matches expected configuration data; and after receiving the respective inputs, transmitting, by the untrusted device, a command initialising generation of a cryptographic parameter by at least one of the tire pressure monitoring devices, and causing the cryptographic parameter to be exchanged with the other tire pressure monitoring devices such that secure future communication is established between the tire pressure monitoring devices, wherein the tire pressure monitoring devices are installed with the respective configuration data, and respective inputs verifying that the installed configuration data matches expected configuration data are received by the untrusted device, sequentially prior to transmission of the command, with configuration data transmitted to a tire pressure monitoring device and verified via the respective input prior to transmission of configuration data to a next sequential tire pressure monitoring device.

According to a third aspect of the present invention there is provided a tire monitoring network comprising first and second tire monitoring devices configured by a method according to the first or second aspect of the present invention.

According to a fourth aspect of the present invention there is provided an aircraft comprising the tire monitoring network according to the third aspect of the present invention.

BRIEF DESCRIPTION OF THE DRAWINGS

Embodiments of the invention will now be described, by way of example only, with reference to the accompanying drawings, in which:

FIG. 4 shows illustrative flashing sequences for LEDs of the tire pressure monitoring devices of FIG. 1 to show device location configuration;

FIG. 5B shows a user interface for verifying a signal seen during a device location configuration check;

FIG. 6 shows illustrative flashing sequences for LEDs of the tire pressure monitoring devices of FIG. 1 to show device reference pressure configuration;

FIG. 7B shows a user interface for verifying a signal seen during a device reference pressure first digit configuration check;

FIG. 7D shows a user interface for verifying a signal seen during a device reference pressure second digit configuration check;

FIG. 12 shows pseudocode for establishment of secure communication in the network of tire pressure monitoring devices of FIG. 3;

FIG. 13 shows an example of a first method according to the present disclosure;

DETAILED DESCRIPTION

Figure 1:
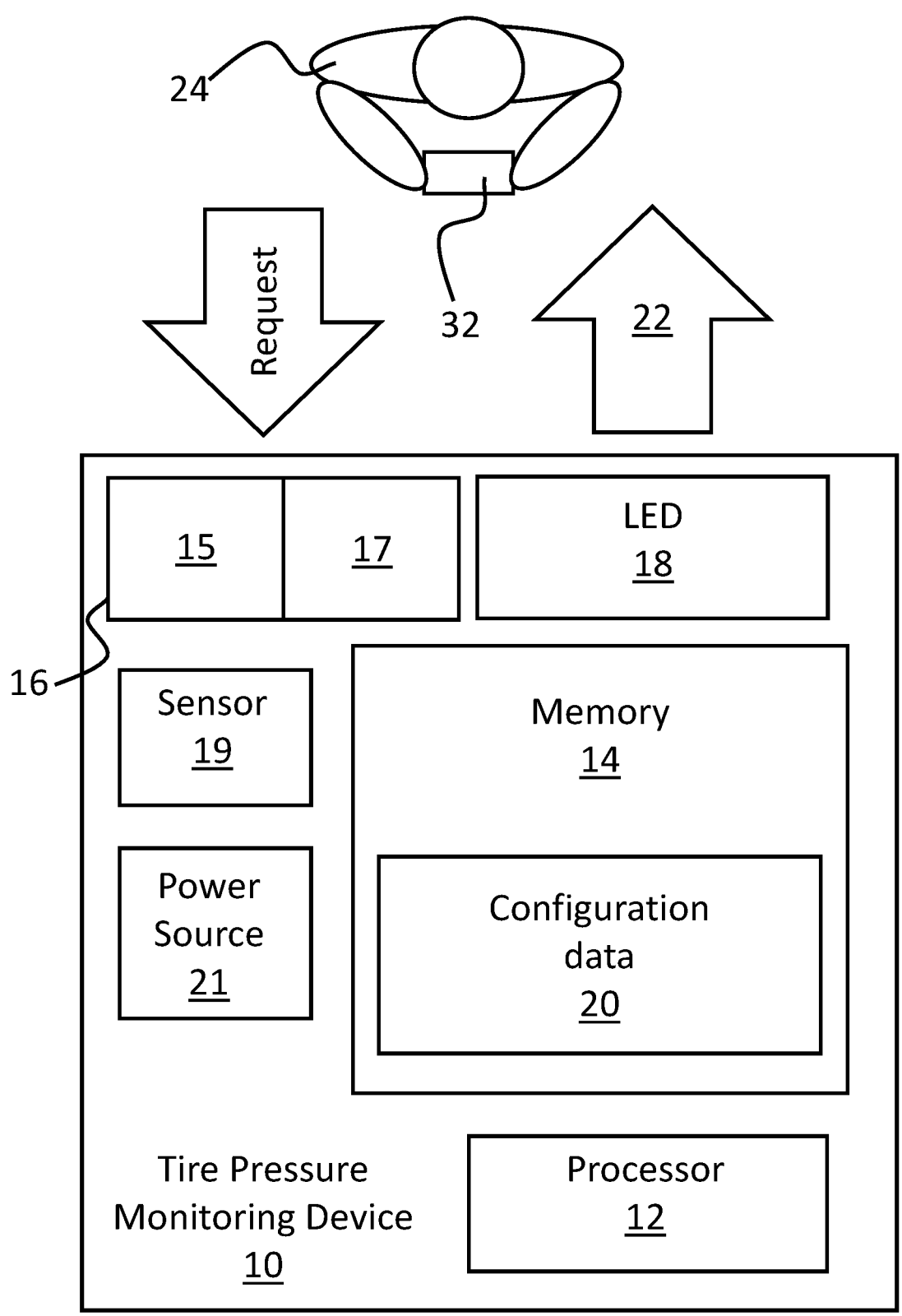
FIG. 1 shows a schematic view of a tire pressure monitoring device.

A tire pressure monitoring device 10 according to an example is shown schematically in FIG. 1. The tire pressure monitoring device 10 comprises a processor 12, a memory 14, a transceiver 16, a visual indicator or display which is an LED 18 in this example, a sensor 19 and a power source 21.

The processor 12 may be any suitable processor including single and multi-core processors, an Application Specific Integrated Circuit (ASIC) or like. The processor 12 is communicatively coupled to the transceiver 16, the LED 18, the memory 14 and the power source 21. The processor 12 is configured to generate various cryptographic parameters, as will be discussed hereinafter.

Memory 14 is a flash memory that stores configuration data 20 and also computer readable instructions for execution by the processor 12 in operation, although it will be appreciated that other types of memory may be used. The configuration data 20 can therefore be updated as required with configuration data. A reference tire pressure is stored in the configuration data 20. Additional data can also be stored in the configuration data 20, for example an aircraft identifier (such as an aircraft Tail identifier) and a wheel position.

Transceiver 16 is an appropriate transceiver capable of receiving a request to confirm the configuration data 20. In this example, the transceiver 16 comprises a first 15 short-range radio signal transceiver operating according to the NFC protocol, and a second 17 transceiver operating according to a Bluetooth low energy (BLE) communication protocol. Although described here as operating according to specific protocols, it will be appreciated that other embodiments where the first 15 and second 17 transceivers operate according to different protocols, for example with the second transceiver 17 operating via a WiFi protocol, are also envisaged. When the transceiver 16 receives a request to confirm the configuration data 20, the processor 12 encodes the configuration data 20 stored in the memory 14 of the tire pressure monitoring device 10, and transmits a signal 22 indicative of the configuration data 20 via the LED 18 to a user 24 observing the tire pressure monitoring device 10. Here the LED 18 is a three-colour LED which is capable of displaying red, blue, and green coloured light. Other examples may use a different number of colours of light than three and/or use other colours than red, blue, and green. Still further examples may utilise a display screen, for example an LCD screen, instead of or in addition to the LED 18. In examples herein, the user 24 is a human. As the user 24 can be taken to be a trusted source, and the tire pressure monitoring device 10 is itself a trusted source, an untrusted device 32 can be used to input the user's verification of the configuration data 20, as will be discussed in more detail hereafter.

The transceiver 16 is further able to transmit and receive cryptographic parameters from the tire monitoring device 10 to other tire monitoring devices 202,204,206,208,210, as will be discussed in more detail hereafter.

Figure 2:
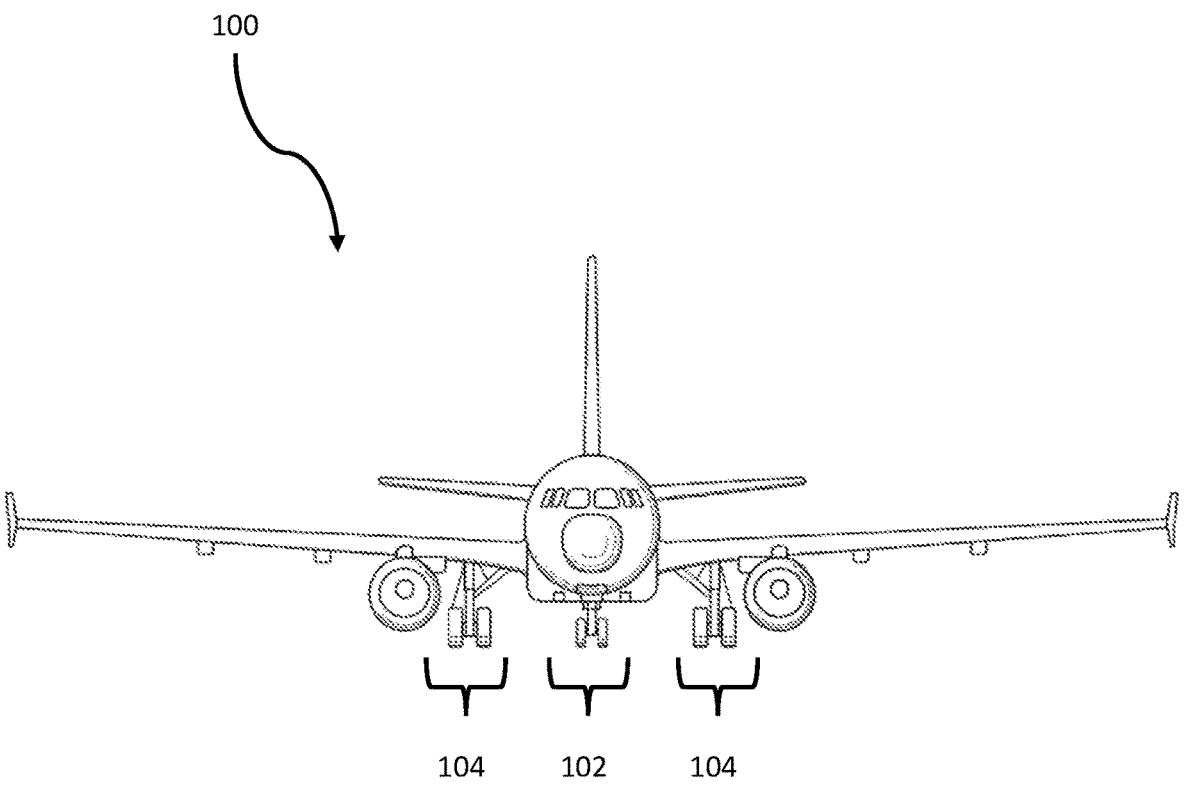
FIG. 2 shows a schematic view of an aircraft incorporating a number of tire pressure monitoring devices as shown in FIG. 1.
Figure 3:
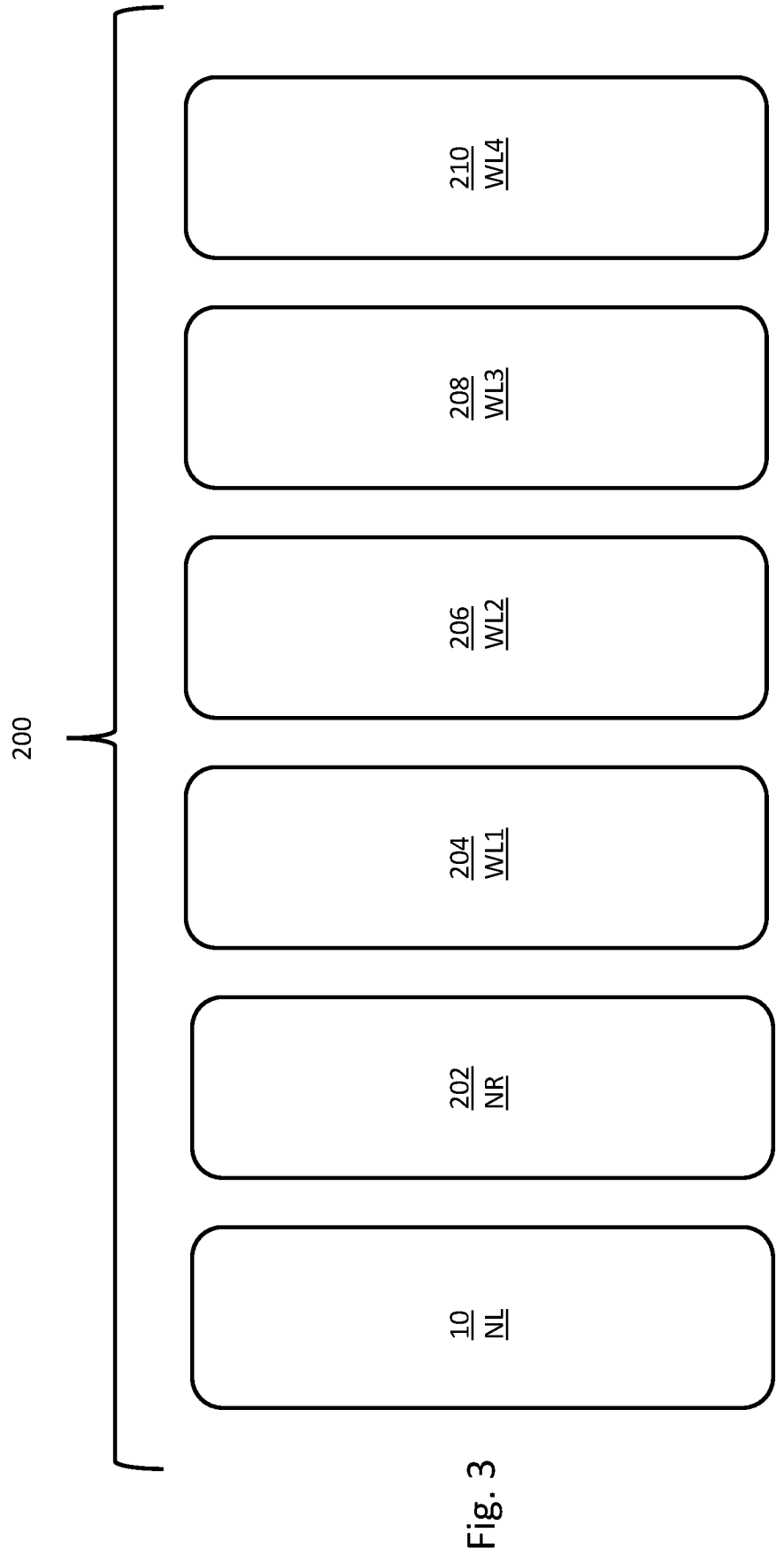
FIG. 3 shows a schematic view of a network of tire pressure monitoring devices.

The tire pressure monitoring device 10 is installed on an aircraft 100 in use, and is one of a network 200 of tire pressure monitoring devices, with the aircraft 100 illustrated schematically in FIG. 2, and the network 200 of tire pressure monitoring devices illustrated schematically in FIG. 3. As an example, the aircraft 100 has a first group 102 of two nose wheels, and a second group 104 of four main landing gear wheels. Each wheel in the first 102 and second 104 groups of wheels has an associated tire pressure monitoring device, such that there are six tire pressure monitoring devices installed on the aircraft 100.

As illustrated in FIG. 3, the tire pressure monitoring device 10 is a first tire pressure monitoring device utilised as left nose tire pressure monitoring device 10, with a second tire pressure monitoring device 202 being a right nose tire pressure monitoring device, a third tire pressure monitoring device 204 being a first main landing gear tire pressure monitoring device, a fourth tire pressure monitoring device 206 being a second main landing gear tire pressure monitoring device, a fifth tire pressure monitoring device 208 being a third main landing gear tire pressure monitoring device, and a sixth tire pressure monitoring device 210 being a fourth main landing gear tire pressure monitoring device. It will be appreciated that each of the second 202 through sixth 210 tire pressure monitoring devices has substantially the same structure and functionality as the first tire pressure monitoring device 10 illustrated in FIG. 1. It will further be appreciated that the locations of each tire pressure monitoring device 10,202,204,206,208,210 are illustrative only, and that any of the tire pressure monitoring devices 10,202,204, 206,208,210 could be used at any wheel location on an aircraft, if so desired.

When initially installed on the aircraft 100, the tire pressure monitoring devices 10,202,204,206,208,210 are not configured, ie do not store the configuration data 20, and are incapable of direct communication between one another. The user 24 therefore uses the untrusted device 32 to configure the network 200 of tire pressure monitoring devices 10,202,204,206,208,210, as will now be described.

Initially, the user 24 approaches the first tire pressure monitoring device 10 to begin configuration. The user 24 inputs the desired configuration data 20 for the first tire pressure monitoring device 10, including the wheel location and reference pressure, into the untrusted device 32, and the first tire pressure monitoring device 10 is touched with the untrusted device 32 to establish near field communication using the first transceiver 15. The desired configuration data 20 may also include an aircraft tail ID, or any other appropriate configuration parameter. The near field communication is used to uniquely identify the tire pressure monitoring device 10 to the untrusted device 32. The configuration data 20 is then transferred from the untrusted device 32 to the first tire pressure monitoring device 10 via a Bluetooth® low energy protocol using the second transceiver 17 as previously described. The configuration data 20 is then stored in the memory 14, with the first tire pressure monitoring device 10 deleting any previously stored configuration data before the newly received configuration data 20 is stored. In other examples the configuration data 20 is transferred from the untrusted device 32 to the first tire pressure monitoring device 10 via near field communication.

Once the configuration data 20 has been stored, the processor 12 generates a key pair comprising a public key 212 and a private key 214, along with a random number 216, with use of these parameters described in more detail herein.

Whilst still at the first tire pressure monitoring device 10 the user 24 checks that the configuration data 20 that has been stored correctly in the memory 14, with the task being led by an aircraft maintenance manual (AMM).

One piece of configuration data 20 to be checked is the installed location of the first tire pressure monitoring device 10. Here, as an example, an AMM task card may provide to the user a list of tire pressure monitoring device locations, eg nose left, nose right, and so on, along with an associated expected flash sequence for the LED 18 which would correctly indicate the associated tire pressure monitoring device location. In the case of the first tire pressure monitoring device 10, which is used as the left nose tire pressure monitoring device in the example previously described, an appropriate flash sequence of the LED 18 may be one green flash, followed by five blue flashes, followed by one red flash. Illustrative appropriate flash sequences (ie signals 22) for tire pressure monitoring device location are shown schematically in FIG. 4.

Figure 5A:
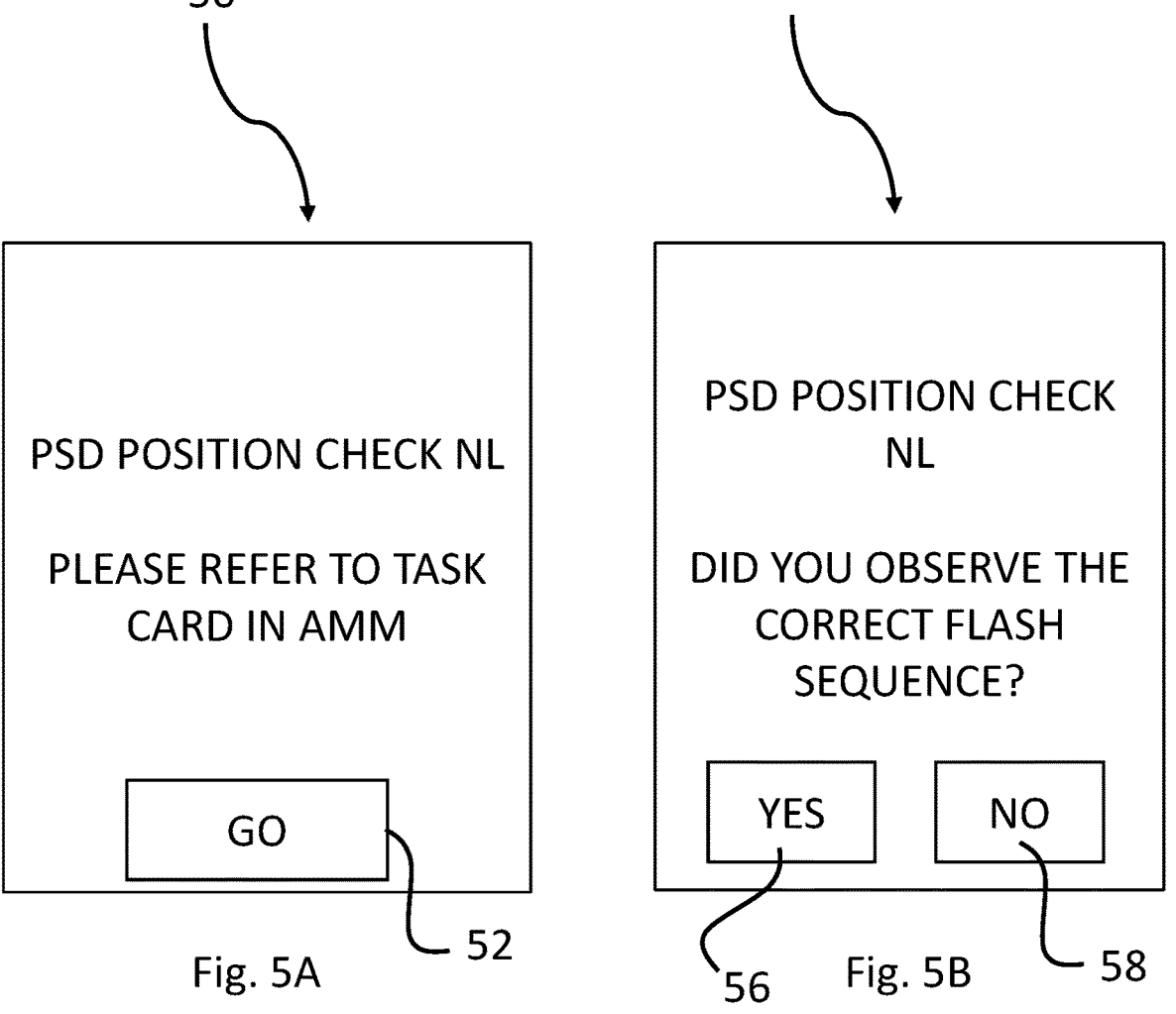
FIG. 5A shows a user interface for initiating a device location configuration check.

When checking the stored location of the first tire pressure monitoring device 10, the user 24 submits a request for the first tire pressure monitoring device 10 to display the stored location, via the LED 18, using a user interface of the untrusted device 32. The untrusted device 32 does not tell the first tire pressure monitoring device 10 which sequence to flash, but rather provides an instruction for the first tire pressure monitoring device 10 to flash its sequence indicative of the stored location. An exemplary user interface 50 for starting the check is shown in FIG. 5A, with the user interacting with user interface element 52 to start the check. An exemplary user interface 54 for a user 24 to verify the signal 22 is shown in FIG. 5B, with the user 24 interacting with user interface elements 56,58 to indicate whether the signal 22 is verified or not. If the signal 22, here indicative of stored location of the first tire pressure monitoring device 10, is not verified, then the configuration data 20 needs to be reloaded, with the process described above repeated. In other examples, if the signal 22, here indicative of stored location of the first tire pressure monitoring device 10, is not verified, the request and subsequent flash sequence is repeated, or the first tire pressure monitoring device 10, the untrusted device 32, or an application running on the untrusted device 32, is replaced.

As the user 24 can be taken to be a trusted source, and the first tire pressure monitoring device 10 is itself a trusted source, the untrusted device 32 can be used to input the user's verification of the configuration data 20. The verification can be trusted because it occurs between the user 24 (who is trusted) and tire pressure monitoring device 10 (which is trusted because of its certification to a particular DAL).

Another piece of configuration data 20 to be checked is the stored reference pressure of the first tire pressure monitoring device 10. Here, as an example, an AMM task card may provide to the user 24 a list of reference pressures for different tire pressure monitoring device locations, eg nose left, nose right, and so on, along with an associated expected flash sequence for the LED 18 which would correctly indicate the associated tire pressure monitoring device reference pressure. In the case of the first tire pressure monitoring device 10, which is used as the left nose tire pressure monitoring device in the example previously described, an appropriate reference pressure may be 178 PSI. Here separate flash sequences of the LED 18 may be performed for each digit of the reference pressure, ie a first flash sequence/signal 22 for the "hundreds" digit, a second flash sequence/signal 22 for the "tens" digit, and a third flash sequence/signal 22 for the "units" digit. The first flash sequence of the LED 18 in such a case may be one green flash, followed by one blue flash, followed by one red flash. The second flash sequence of the LED 18 in such a case may be one green flash, followed by seven blue flashes, followed by one red flash. The third flash sequence of the LED 18 in such a case may be one green flash, followed by eight blue flashes, followed by one red flash. Illustrative appropriate flash sequences (ie signals 22) for tire pressure monitoring device reference pressure are shown schematically in FIG. 6.

Figures 7A, 7C:
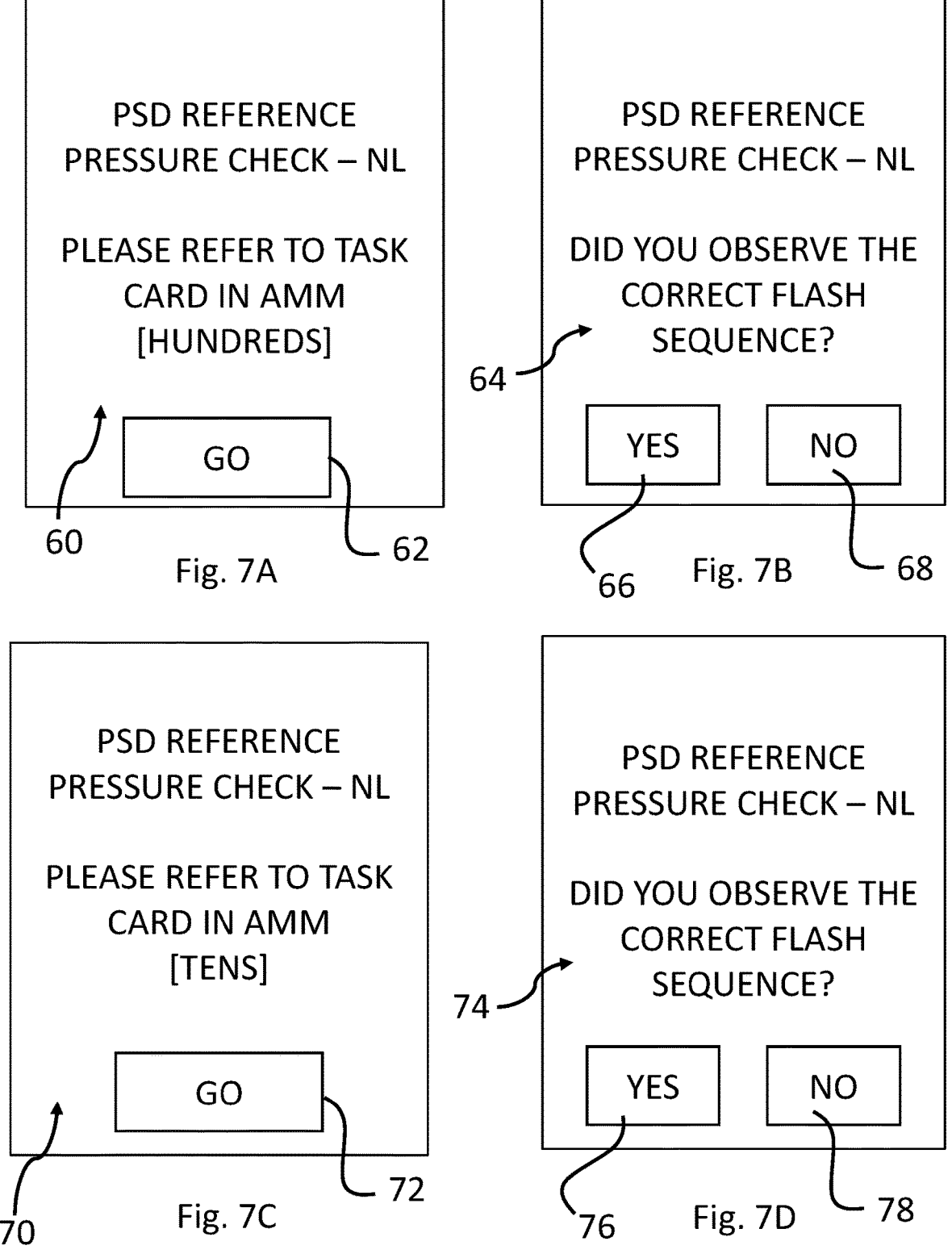
FIG. 7A shows a user interface for initiating a device reference pressure first digit configuration check.
FIG. 7C shows a user interface for initiating a device reference pressure second digit configuration check.

When checking the stored reference pressure of the first tire pressure monitoring device 10, the user 24 submits a request for the first tire pressure monitoring device 10 to display the stored reference, via the LED 18, using a user interface of the untrusted device 32. The untrusted device 32 does not tell the first tire pressure monitoring device 10 which sequence to flash, but rather provides an instruction for the first tire pressure monitoring device 10 to flash its sequence indicative of the stored reference pressure. An exemplary user interface 60 for starting the check for the "hundreds" digit is shown in FIG. 7A, with the user 24 interacting with user interface element 62 to start the check for the "hundreds" digit. An exemplary user interface 64 for a user 24 to verify the signal 22 for the "hundreds" digit is shown in FIG. 7B, with the user 24 interacting with user interface elements 66,68 to indicate whether the signal 22 is verified or not.

Figure 7E:
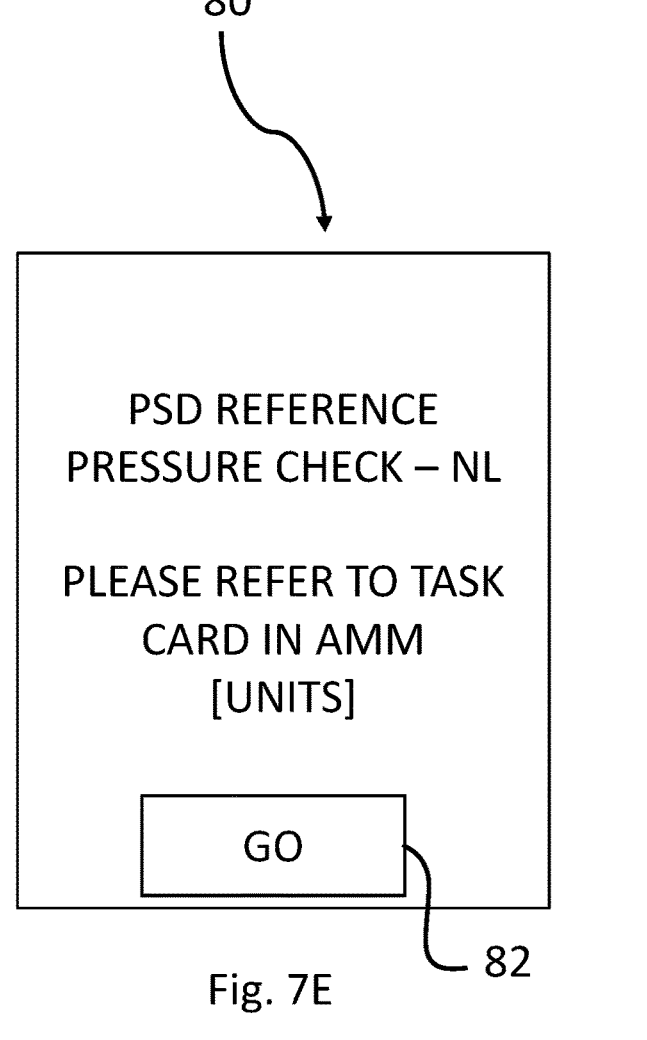
FIG. 7E shows a user interface for initiating a device reference pressure third digit configuration check.
Figure 7F:
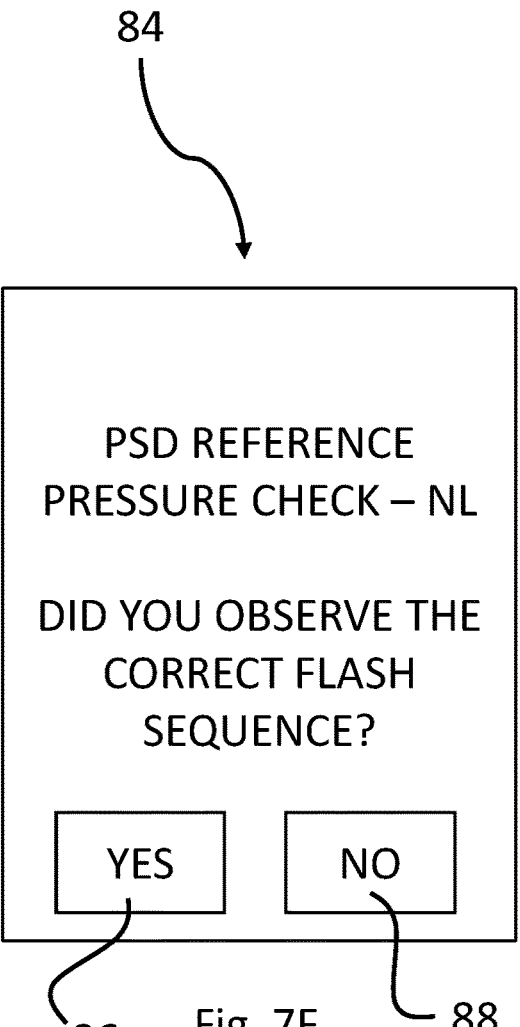
FIG. 7F shows a user interface for verifying a signal seen during a device reference pressure third digit configuration check.

Similarly an exemplary user interface 70 for starting the check for the "tens" digit is shown in FIG. 7C, with the user 24 interacting with user interface element 72 to start the check for the "tens" digit. An exemplary user interface 74 for a user 24 to verify the signal 22 for the "tens" digit is shown in FIG. 7D, with the user 24 interacting with user interface elements 76,78 to indicate whether the signal 22 is verified or not. An exemplary user interface 80 for starting the check for the "units" digit is shown in FIG. 7E, with the user 24 interacting with user interface element 82 to start the check for the "units" digit. An exemplary user interface 84 for a user to verify the signal 22 for the "units" digit is shown in FIG. 7F, with the user 24 interacting with user interface elements 86,88 to indicate whether the signal 22 is verified or not.

Once the desired configuration data 20 has been verified for the first tire pressure monitoring device 10, the user can move to the next tire pressure monitoring device 202,204, 206,208,210 and perform the same steps to ensure configuration of each of the tire pressure monitoring devices 10,202, 204,206,208,210.

Figure 8:
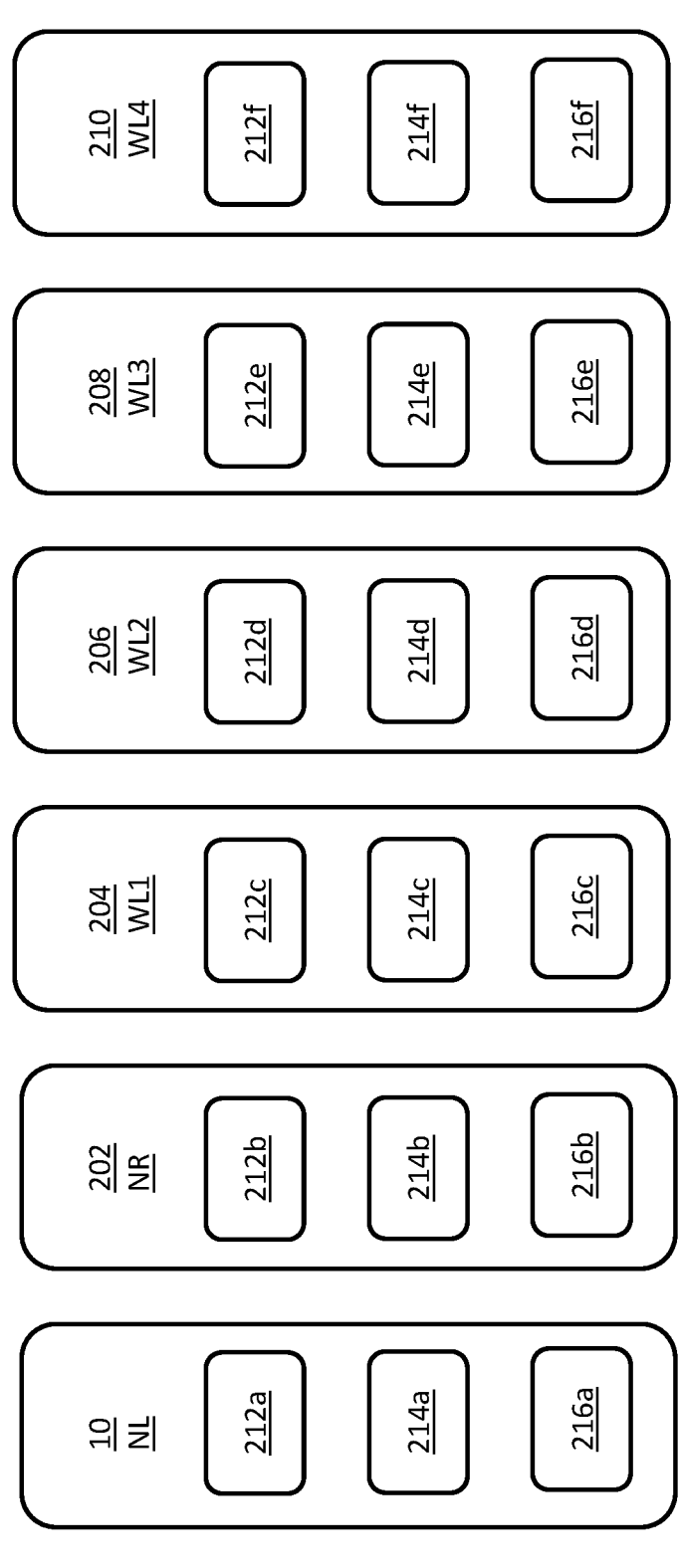
FIG. 8 shows the network of tire pressure monitoring devices of FIG. 3 with private-public key pairs and random numbers generated.

As will be appreciated from the discussion above, during the process of configuring each tire pressure monitoring device 10,202,204,206,208,210, each tire monitoring device 10,202,204,206,208,210 generates a respective key pair comprising a public key 212a-212f and a private key 214a-214f, along with a random number 216a-216f. This is illustrated schematically in FIG. 8, and these cryptographic parameters are utilised to establish secure communication within the network 200 of tire pressure monitoring devices 10,202,204,206,208,210. The key pair and random number can be generated in any suitable way, in this example, the key pair is generated using any suitable cryptographic pseudo-random generator.

Figure 9:
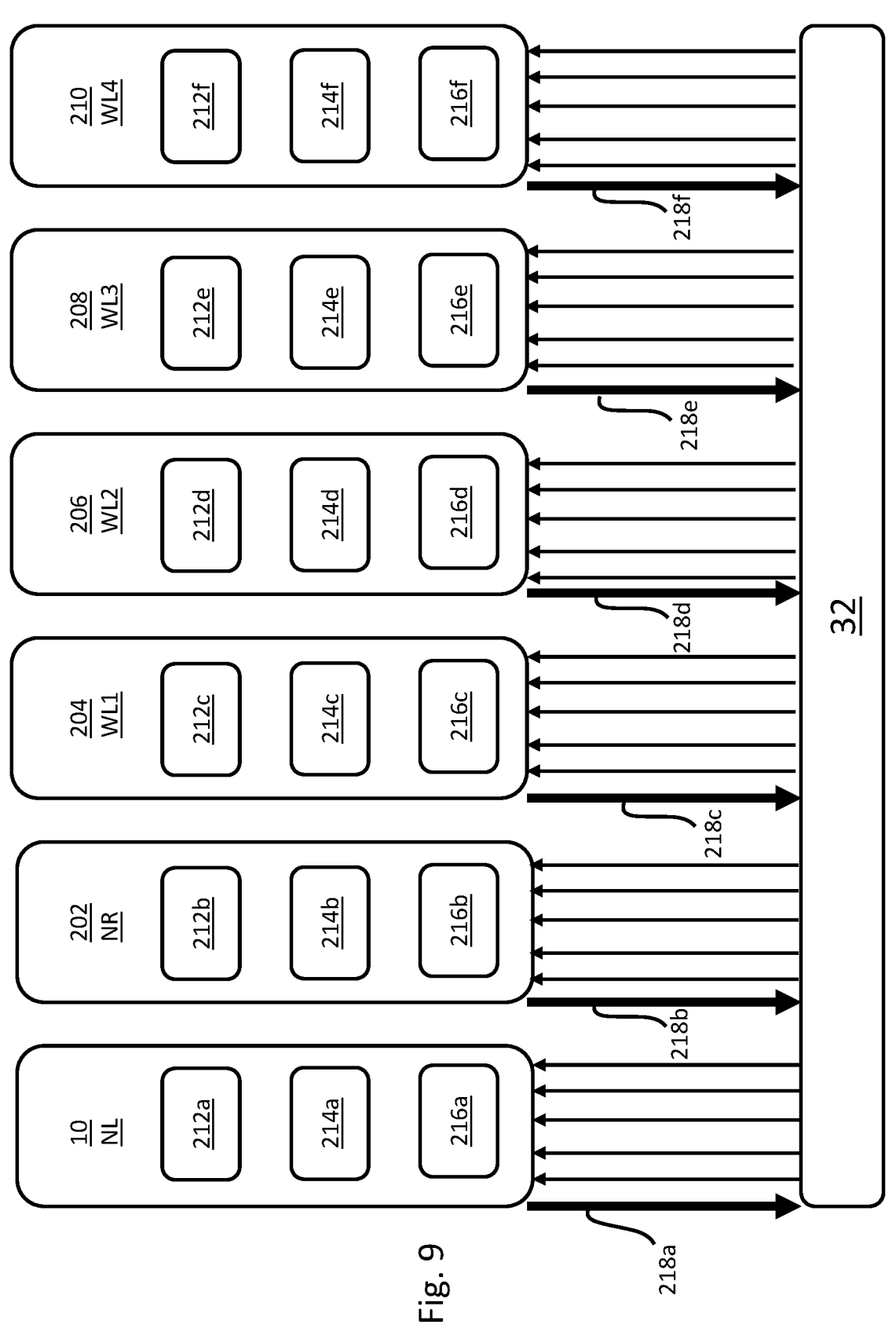
FIG. 9 shows the network of tire pressure monitoring devices of FIG. 3 broadcasting a first message to one another.

As a first step in establishing secure communication, illustrated schematically in FIG. 9, each tire pressure monitoring device 10,202,204,206,208,210, responsive to a command from the untrusted device 32, broadcasts, in a respective first message 218a-218f, its public key 212a-212f and its configuration data 20 to each of the other tire pressure monitoring devices 10,202,204,206,208,210. In other words, each tire pressure monitoring device broadcasts the first message to all of the other tire pressure monitoring devices. The untrusted device 32 is used as a router for the first messages 218a-218f, with each tire pressure monitoring device 10,202,204,206,208,210 receiving the other first messages 218a-218f via the untrusted device. Here bold arrows denote sent messages, whilst non-bold arrows denote received messages. The first messages 218a-218f are broadcast and received via the second receiver 17 of each tire pressure monitoring device 10,202,204,206,208,210, using a BLE protocol. Once all first messages 218a-218f are sent and received, each tire pressure monitoring device 10,202, 204,206,208,210 knows the public key 212a-212f and configuration data 20 of each other tire pressure monitoring device 10,202,204,206,208,210. By broadcasting the first messages 218a-218f from the tire pressure monitoring devices 10,202,204,206,208,210, a number of messages sent by each tire pressure monitoring device 10,202,204,206,208, 210 may be reduced compared to, for example, an arrangement where each tire pressure monitoring device 10,202, 204,206,208,210 unicasts its public key 212a-212f and/or its configuration data 20 to each other tire pressure monitoring device 10,202,204,206,208,210. Through the use of a broadcast message, a single transmitted message from a tire monitoring device may be received by a plurality of other devices, reducing message traffic and saving power. As illustrated in FIG. 9, a single transmitted message is received by all of the other tire monitoring devices.

Figure 10:
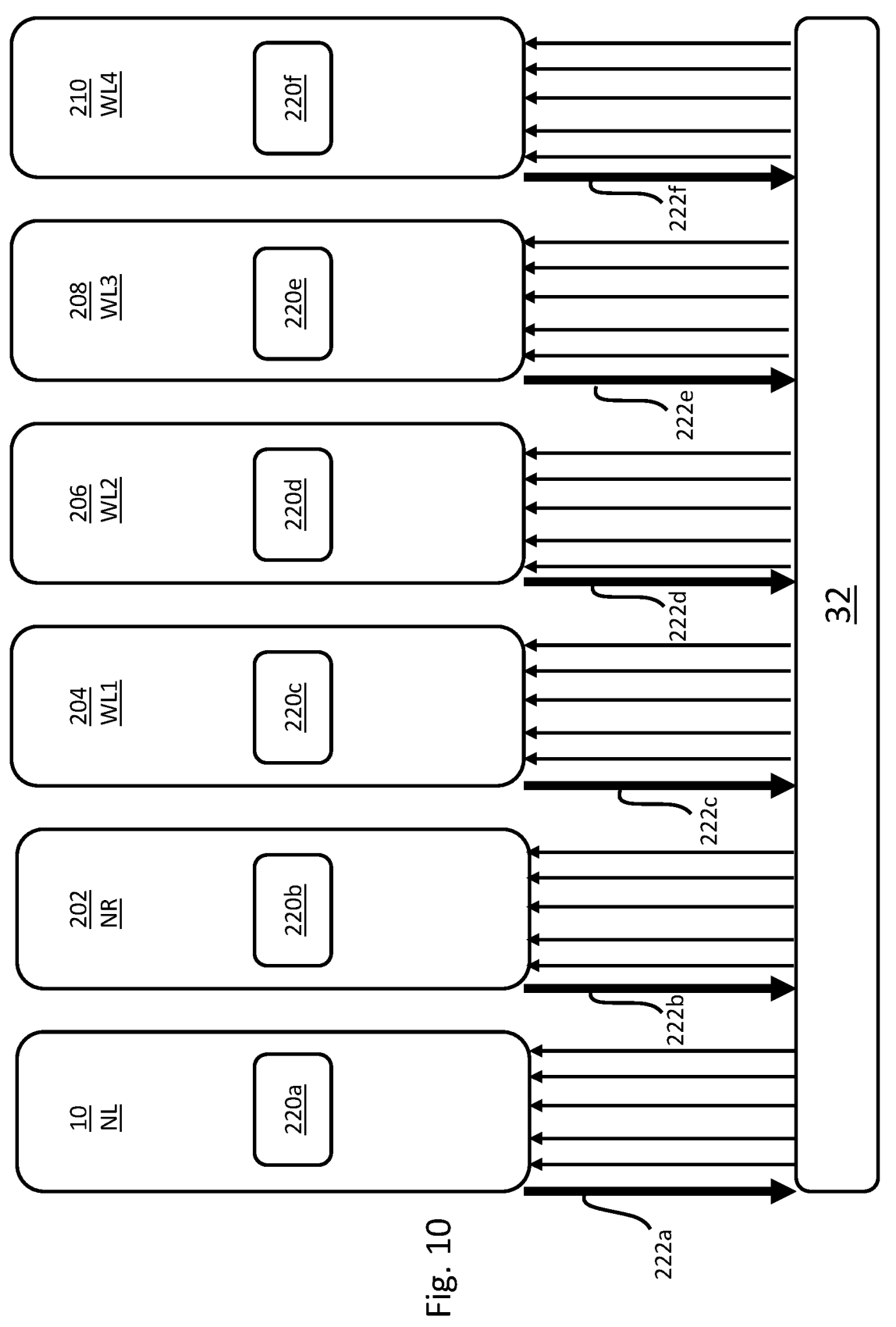
FIG. 10 shows the network of tire pressure monitoring devices of FIG. 3 broadcasting a second message to one another.

As a second step in establishing secure communication, illustrated schematically in FIG. 10, the processor 12 of each tire pressure monitoring device 10,202,204,206,208,210 uses its own random number 216-216f, the public keys 212a-212f both generated and received by the tire pressure monitoring device 10,202,204,206,208,210, and its own configuration data 20, to generate a cryptographic commitment 220a-220f. The cryptographic commitment can be generated in any suitable way, in this example it is generated using a hash-based concurrent non-malleable commitment. Each tire pressure monitoring device 10,202,204,206,208, 210 broadcasts, in a second message 222a-222f, its respective cryptographic commitment 220a-220f to each of the other tire pressure monitoring devices 10,202,204,206,208, 210.

The untrusted device 32 is used as a router for the second messages 222a-222f, with each tire pressure monitoring device 10,202,204,206,208,210 receiving the other second messages 222a-222f via the untrusted device 32. Here bold arrows denote sent messages, whilst non-bold arrows denote received messages. The second messages 222a-222f are broadcast and received via the second receiver 17 of each tire pressure monitoring device 10,202,204,206,208,210, using a BLE protocol. Once all second messages 222a-222f are sent and received, each tire pressure monitoring device 10,202,204,206,208,210 knows the cryptographic commitment 220*a*-220*f* of each other tire pressure monitoring device 10,202,204,206,208,210. By broadcasting the second messages 222*a*-222*f* from the tire pressure monitoring devices 10,202,204,206,208,210, a number of messages sent by each tire pressure monitoring device 10,202,204,206,208, 210 may be reduced compared to, for example, an arrangement where each tire pressure monitoring device 10,202, 204,206,208,210 unicasts its cryptographic commitment 220*a*-220*f* to each other tire pressure monitoring device 10,202,204,206,208,210.

Figure 11:
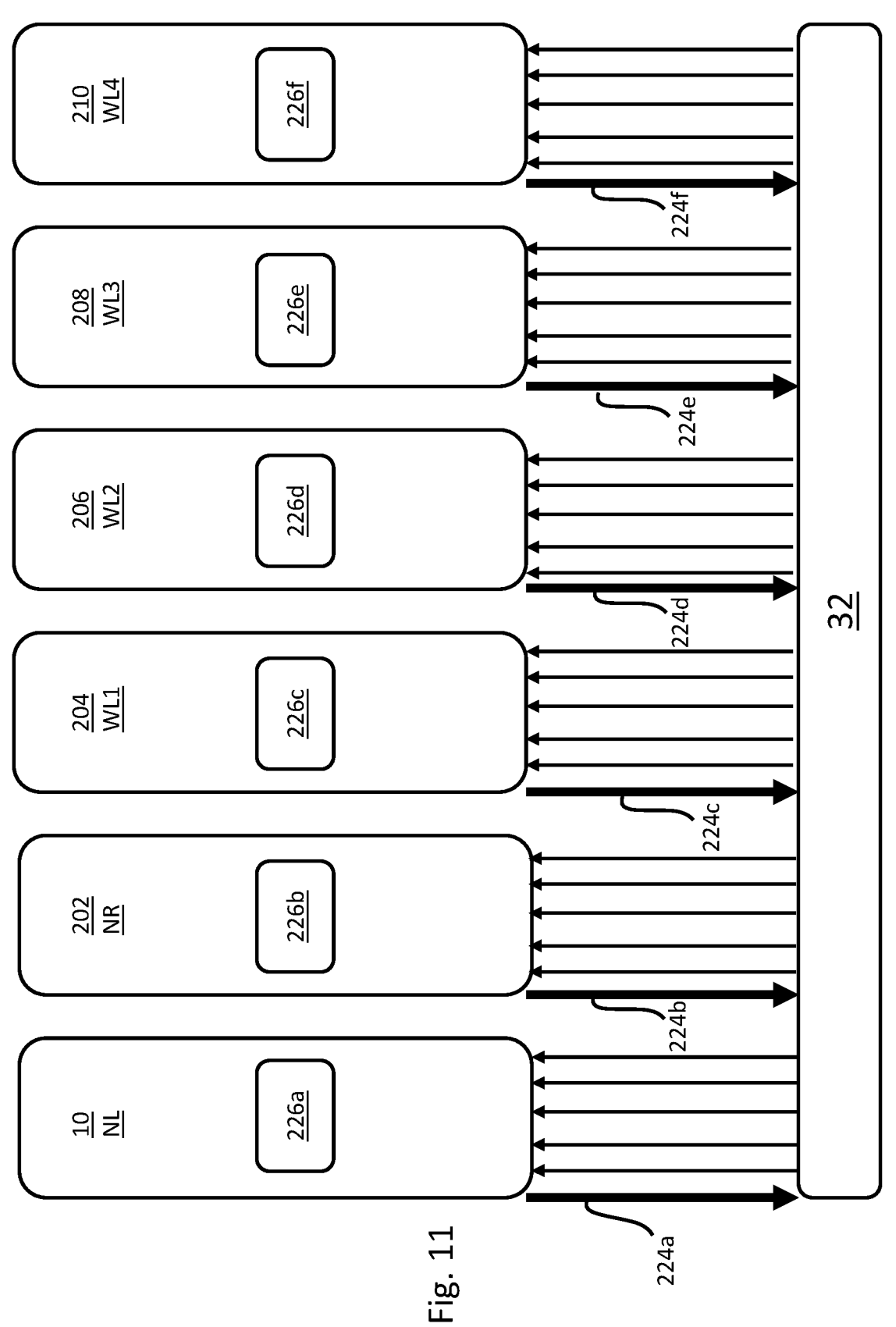
FIG. 11 shows the network of tire pressure monitoring devices of FIG. 3 broadcasting a third message to one another.

As a third step in establishing secure communication, illustrated schematically in FIG. 11, each tire pressure monitoring device 10,202,204,206,208,210 broadcasts, in a respective third message 224*a*-224*f*, an input 226*a*-226*f* to open the respective cryptographic commitment 220*a*-220*f*, to each other tire pressure monitoring device 10,202,204, 206,208,210. Here bold arrows denote sent messages, whilst non-bold arrows denote received messages. The third messages 224*a*-224*f* are broadcast and received via the second receiver 17 of each tire pressure monitoring device 10,202, 204,206,208,210, using a BLE protocol. Once all third messages 224*a*-224*f* are sent and received, each tire pressure monitoring device 10,202,204,206,208,210 can open and verify the cryptographic commitments 220*a*-220*f* received from the other tire pressure monitoring devices 10,202,204, 206,208,210. By broadcasting the third messages 224*a*-224*f* from the tire pressure monitoring devices 10,202,204,206, 208,210, a number of messages sent by each tire pressure monitoring device 10,202,204,206,208,210 may be reduced compared to, for example, an arrangement where each tire pressure monitoring device 10,202,204,206,208,210 unicasts its input 226*a*-226*f* to each other tire pressure monitoring device 10,202,204,206,208,210.

Where a cryptographic commitment 220*a*-220*f* cannot be verified, the establishment of secure communication is aborted, and an error message is communicated to the untrusted device 32. For example, the error message could be communicated using Bluetooth® or NFC to the untrusted device 32 for display by the untrusted device 32. Alternatively, or additionally, the error message could be communicated using the LED of the tire pressure monitoring device, such as by lighting the LED continuously red.

Where the cryptographic commitments 220*a*-220*f* are all verified, each tire pressure monitoring device 10,202,204, 206,208,210 generates, for each other tire pressure monitoring device 10,202,204,206,208,210, a seed for a pseudo-random generator. The generation of the seed comprises utilising a hash function with inputs of the private key 214*a*-214*f* of the tire pressure monitoring device 10,202, 204,206,208,210 performing the generation, and the public key 212*a*-212*f* of the tire pressure monitoring device 10,202, 204,206,208,210 for which generation is being performed.

Using the pseudo random generator, each tire pressure monitoring device 10,202,204,206,208,210 generates a shared key pair comprising a first shared key k, and a second shared key k', using any suitable cryptographic pseudo-random generator such as AES in counter mode.

Each tire pressure monitoring device 10,202,204,206,208, 210 then generates, for each other tire pressure monitoring device 10,202,204,206,208,210, a value using a pseudo-random function based on the first shared key k, and associated random numbers 216*a*-216*f* and the respective public keys 212*a*-212*f* of the two tire pressure monitoring devices 10,202,204,206,208,210 in question as inputs to the pseudo-random function. The pseudo-random function may comprise any suitable cryptographic pseudo-random function such as HMAC.

Each tire pressure monitoring device 10,202,204,206,208, 210 sends its respective values to the other tire pressure monitoring devices 10,202,204,206,208,210, with each tire pressure monitoring device 10,202,204,206,208,210 checking validity of the received values using the same pseudo-random function based on the first shared key k.

Where a value cannot be verified, the establishment of secure communication is aborted, and an error message is communicated to the untrusted device 32. For example the error message could be communicated using Bluetooth® or NFC to the untrusted device 32 for display by the untrusted device 32. Alternatively, or additionally, the error message could be communicated using the LED of the tire pressure monitoring device, such as by lighting the LED continuously red.

Where values are verified, the respective tire pressure monitoring devices 10,202,204,206,208,210 use the respective second shared keys k' for secure future communication. Although the establishment of the secure communication required the use of unencrypted messages between the tire pressure monitoring devices, the untrusted device 32 cannot know the second shared keys k' because generating these requires knowledge of the private keys that are not shared.

In such a manner secure communication can be established between tire pressure monitoring devices 10,202,204, 206,208,210 of the network 200, i.e. with secure communication established on a pair-wise basis. The untrusted device does not know the second shared keys k' used for communication, and the numbers of messages required to be exchanged is reduced by the use of broadcast messages. Furthermore, the secure communication does not require a pre-installed key or the like on the tire pressure monitoring devices 10, 202, 204, 206, 208, 210.

Where secure communication has been established, the tire pressure monitoring devices 10,202,204,206,208,210 can be used to communicate to the user that each tire pressure monitoring device 10,202,204,206,208,210 shares the same security code. Here each tire pressure monitoring device 10,202,204,206,208,210 generates a numerical value, representing a security code, that can be communicated to the user 24 by flashing the LED 18 in a manner similar to that previously described in relation to the checks of configuration data 20. The numerical value in some examples comprises a truncated hash of the configuration data 20, public keys 212*a*-212*f* and random numbers 216*a*-216*f*, such as a truncated hash function with an input of a concatenation of the configuration data 20, public keys 212*a*-212*f* and random numbers 216*a*-216*f*. Any suitable hash function can be used, such as SHA-3. As each of the tire pressure monitoring devices 10,202,204,206,208,210 knows the same configuration data 20, public keys 212*a*-212*f* and random numbers 216*a*-216*f*, the truncated hash, and hence the security code, should be the same for each tire pressure monitoring device 10,202,204,206,208,210.

Checking of security codes is, in some examples, led by the aircraft maintenance manual (AMM), with an AMM task card being utilised by the user 24 to fill in security codes indicated by the received signals 22. Similar to the signals for reference pressure discussed in relation to FIGS. 6 and 7A-7F, signals 22 indicative of security codes communicated by flashing the LEDs 18 of the tire pressure monitoring devices 10,202,204,206,208,210 may comprise three digits, with each digit, ie "hundreds", "tens", "units" flashed using a separate signal 22. Each separate signal 22 may comprise a green flash to start, a red flash to end, and a number of blue flashes intermediate the green and red flashes to indicate the digit to the user 24. The AMM may provide the option for a user to indicate whether an observed flash is short (i.e. quick) or long (i.e. slow). User interfaces on the untrusted device 32 may be used to initiate transmission of a signal 22, and to confirm once a signal 22 has been received by the user 24.

Where the security codes flashed by the LEDs 18 of each tire pressure monitoring device 10,202,204,206,208,210 match, successful configuration may be determined. Where any of the security codes do not match, this is considered indicative of incorrect configuration, and re-configuration of the network 200 of tire pressure monitoring devices 10,202, 204,206,208,210 needs to take place.

Pseudo code illustrating the steps involved in establishing secure communication and checking security codes is illustrated in FIG. 12. Here PSD refers to a tire pressure sensing device 10,202,204,206,208,210, UDEV refers to the untrusted device 32, pk denotes the public keys 212a-212f, sk denotes the private keys 214a-214f, r denotes the random numbers 216a-216f, and config denotes the relevant configuration data 20.

As mentioned above, in some examples broadcasting messages from a tire pressure monitoring device 10,202, 204,206,208,210 to the other tire pressure monitoring devices 10,202,204,206,208,210 may reduce message count compared to a similar arrangement where each tire pressure monitoring device 10,202,204,206,208,210 unicasts a message to each other tire pressure monitoring device 10,202, 204,206,208,210. Such methods may, in some examples, be thought of as comprising broadcasting, from each tire monitoring device 10,202,204,206,208,210 to each other tire monitoring device 10,202,204,206,208,210, a message comprising a cryptographic parameter generated by that respective tire monitoring device 10,202,204,206,208,210.

A method 300 illustrating steps involved in establishing secure communication in a network of tire pressure monitoring devices, in accordance with the previously described examples, is illustrated in the flow diagram of FIG. 13.

The method 300 comprises generating 302, at each tire monitoring device, a public key, and broadcasting 304, from each tire monitoring device to each other tire monitoring device, the respective public keys. The method 300 comprises generating 306, at each tire monitoring device, a cryptographic commitment using the public keys generated and received by the respective tire monitoring device, and broadcasting 308, from each tire monitoring device to each other tire monitoring device, the respective cryptographic commitments. The method 300 comprises broadcasting 310, from each tire monitoring device to each other tire monitoring device, an input to open the cryptographic commitment generated by that tire monitoring device, and verifying 312, at each tire monitoring device, the commitments received by the respective tire monitoring device using the respective inputs.

The method 300 comprises generating 314, at each tire monitoring device, a shared key pair for the tire monitoring device and each other tire monitoring device, each shared key pair comprising a first shared key and a second shared key, and generating 316, at each tire monitoring device, using a function based on the respective first shared keys, a value to communicate to each other tire monitoring device. The method 300 comprises unicasting 318, from each tire monitoring device to each other tire monitoring device, a respective generated value to each other tire monitoring device, and verifying 320, at each tire monitoring device, received generated values. Where received generated values are correctly verified, the method 300 comprises establishing 322 secure future communication between respective tire monitoring devices using the respective second shared keys. In some examples, the method 300 may then comprise a step of performing a tire pressure check using the generated cryptographic keys, such that data transferred between the tire monitoring devices is secured.

By utilising the method 300, secure communication between tire pressure monitoring devices can be established, whilst reducing message count via use of broadcasting rather than unicasting. For example, if a protocol similar to Bluetooth's numeric comparison mode were used to establish pairwise keys between the tire monitoring devices, then to establish keys between n tire monitoring devices would require n*(n−1)/2 executions of the Bluetooth numeric comparison protocol. This would imply that each of the n tire monitoring devices sends (in the order of) n messages, and the user would have to verify each of the n*(n−1)/2 keys manually. In contrast, with the method 300, each tire monitoring device only sends (in the order of) one single message. The method 300 also enables a high level of security to be maintained in setting-up the secure communication.

It will be appreciated that the use of broadcast messages can be applied to methods to establish secure communication between devices other than the specific examples described herein. For example, when a plurality of devices are all establishing secure communication at the same time, broadcast messages may be useful to reduce message traffic when a plurality of devices all need to receive the same piece of information (such as a device's public key). Alternatively, or additionally, broadcast messages can reduce message traffic by combining messages for multiple recipients into a single message, with each recipient retrieving its part of the combined message.

From the discussion above, it will further be appreciated that, when configuring the network 200 of tire pressure monitoring devices 10,202,204,206,208,210, each tire pressure monitoring device 10,202,204,206,208,210 is loaded with configuration data 20 and verified before moving on to the next tire pressure monitoring device 10,202,204,206, 208,210. In such a manner the tire pressure monitoring devices 10,202,204,206,208,210 are loaded and verified sequentially. Furthermore, once the tire pressure monitoring devices 10,202,204,206,208,210 have all been loaded and verified, the process of establishing secure future communication can be initialised by the user 24 using the untrusted device 32.

In particular, the user 24 can initialise the process of establishing secure further communication by using the untrusted device 32 to send a command to the tire pressure monitoring devices 10,202,204,206,208,210 to broadcast, in a respective first message 218a-218f, their public key 212a-212f and their configuration data 20 to each of the other tire pressure monitoring devices 10,202,204,206,208,210, as outlined with respect to FIG. 9 above. Such a command is sent via Bluetooth®, with the user 24 stood at an appropriate location within range of each of the tire pressure monitoring devices 10,202,204,206,208,210. The subsequent steps of FIGS. 10-12, can then take place, either automatically or in response to further commands issued via the untrusted device 32.

In such a manner, configuration of the network 200 of tire pressure monitoring devices 10,202,204,206,208,210 can take place in an efficient manner by the user 24. In particular, the user 24 need only make a single circuit of the tire pressure monitoring devices 10,202,204,206,208,210 in order to load and subsequently verify the configuration data 20 of the tire pressure monitoring devices 10,202,204,206, 208,210, before initialising establishment of secure future communication in the manner previously described.

Figure 14:
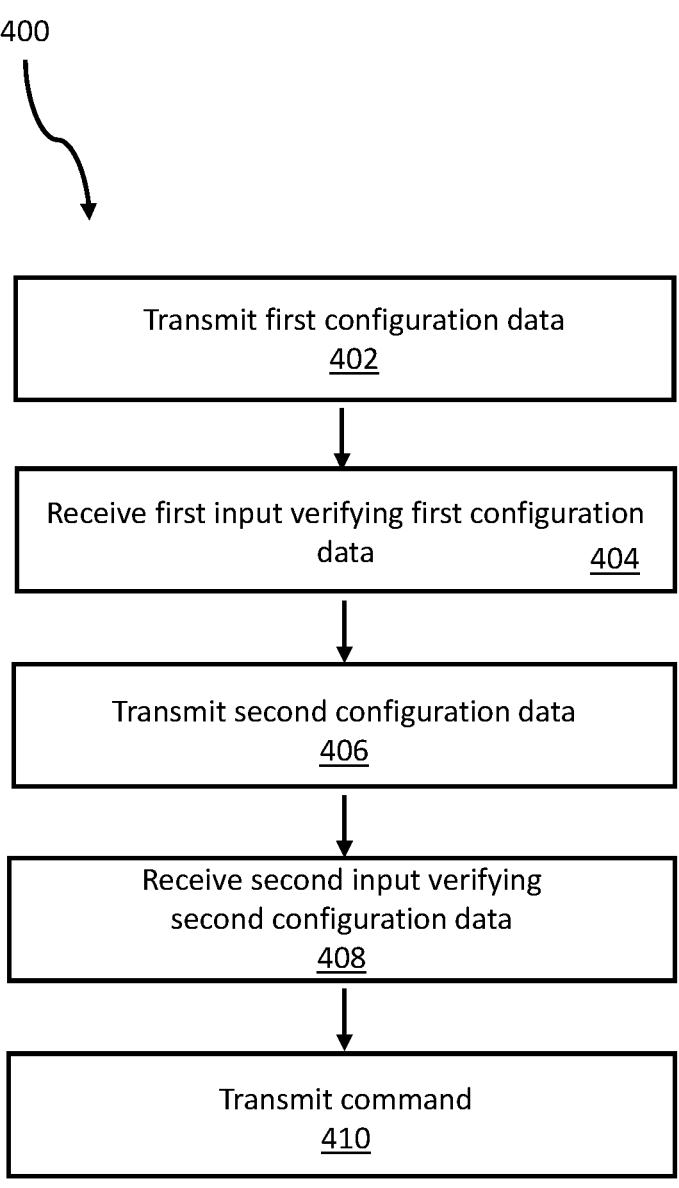
FIG. 14 shows an example of a second method according to the present disclosure.

A method 400 associated with configuring the network 200 of tire pressure monitoring devices 10,202,204,206,208, 210 is illustrated in FIG. 14.

The method 400 comprises transmitting 402, by the untrusted device 32, first configuration data to a first tire monitoring device, and receiving 404, by the untrusted device 32, a first input verifying that the first configuration data has been loaded to the first tire monitoring device and matches expected first configuration data.

The method 400 comprises transmitting 406, by the untrusted device 32, second configuration data to a second tire monitoring device, and receiving 408, by the untrusted device, a second input verifying that the second configuration data has been loaded to the second tire monitoring device and matches expected second configuration data. The method 400 comprises, after receipt of both the first input and the second input, transmitting 410, by the untrusted device, a command initialising generation of a cryptographic parameter by the first tire monitoring device, and causing the cryptographic parameter to be exchanged with the second tire monitoring device such that secure future communication is established between the first and second tire monitoring devices.

Figure 15:
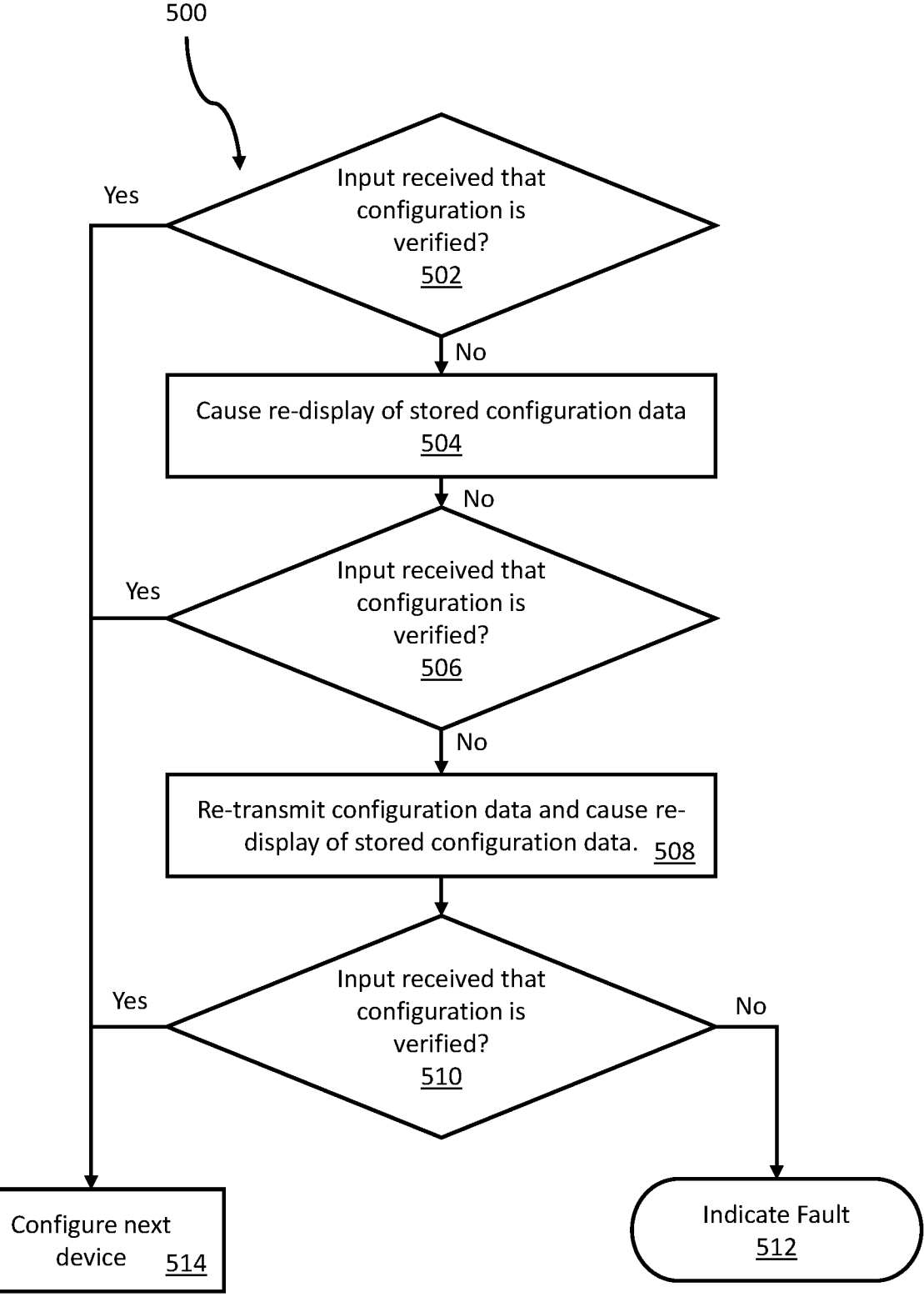
FIG. 15 shows an example of a third method according to the present disclosure.

It will be appreciated that further steps of transmitting configuration data and receiving inputs verifying configuration data can take place, prior to transmission 410 of the command initialising generation of the cryptographic parameter by the first tire monitoring device, depending on the number of tire pressure monitoring devices to be configured.

Where configuration data 20 cannot be verified by the user 24, such as where the sequence flashed by the LED 18 does not match an expected sequence, steps may be taken to ensure that configuration data 20 has been correctly loaded. One such example method 500 is depicted in FIG. 15. At 502 it is determined whether input has been received that the configuration is verified. For example, no input verifying that the displayed sequence matches the expected sequence may have been received (such as after a timer expires without input) or an input indicating that the sequence did not match that expected has been received. If an input was received, the method continues to block 514, and the method of FIG. 14 continues. If no input verifying configuration is received, the relevant tire pressure monitoring device 10,202,204,206,208,210 may be caused or commanded to re-display the stored configuration data 20, via the LED 18 at block 504. This can check for possible human error in identifying the expected sequence.

At block 506, if no input is received that the re-displayed configuration data 20 matches the expected configuration data, such as receiving a further input that the LED flashes did not match the expected sequence or a further timeout elapsing, that particular tire pressure monitoring device 10,202,204,206,208,210, can be reloaded with the configuration data 20 at block 508 and a subsequent verification attempt made. This can check for a possible error when loading the data. If no input that the stored configuration data 20 matches the expected configuration data is again received at block 510, the untrusted device 32 can indicate a fault condition at block 512, with the fault condition indicative of a fault with the tire pressure monitoring device in question and/or a fault with the untrusted device 32. Configuration of the tire monitoring devices may then end, until the fault is resolved by replacing the tire pressure monitoring device and/or the untrusted device 32.

In any of blocks 502, 506 and 510 receipt of input that the configuration is verified causes the configuration process of FIG. 14 to resume, such as with the configuration of a subsequent tire pressure monitoring device, or by transmitting the command initialising generation of the cryptographic parameter if all the tire monitoring devices are configured.

By taking the above steps, incorrect loading of configuration data 20 can be identified whilst the user 24 is at a particular tire pressure monitoring device 10,202,204,206, 208,210, which may prove more efficient than, for example, a method where verification steps are not performed until each tire pressure monitoring device 10,202,204,206,208, 210 has been loaded. In particular, the steps described above may facilitate the user 24 needing only to make a single circuit of the tire pressure monitoring devices 10,202,204, 206,208,210 in order to load and subsequently verify the configuration data 20.

It is to noted that the term "or" as used herein is to be interpreted to mean "and/or", unless expressly stated otherwise.

The invention claimed is:

1. A method of configuring a network of tire monitoring devices using an untrusted device, the method comprising:
   transmitting, by the untrusted device, first configuration data to a first tire monitoring device;
   receiving, by the untrusted device, a first input verifying that the first configuration data has been loaded to the first tire monitoring device and matches expected first configuration data;
   transmitting, by the untrusted device, second configuration data to a second tire monitoring device;
   receiving, by the untrusted device, a second input verifying that the second configuration data has been loaded to the second tire monitoring device and matches expected second configuration data; and
   after receipt of both the first input and the second input, transmitting, by the untrusted device, a command initializing generation of a cryptographic parameter by the first tire monitoring device, and causing the cryptographic parameter to be exchanged with the second tire monitoring device such that secure future communication is established between the first and second tire monitoring devices.

2. A method according to claim 1, wherein verifying that the first configuration data loaded to the first tire monitoring device matches expected first configuration data comprises transmitting, by the first tire monitoring device, a configuration data signal which encodes the first configuration data, wherein the configuration data signal is configured to be received and understood by a human, and receiving, by the untrusted device, the first input via a human interaction with the untrusted device.

3. A method according to claim 2, wherein the configuration data signal comprises a visual signal, and the visual signal is transmitted using a visual indicator of the first tire monitoring device.

4. A method according to claim 3, wherein the visual indicator comprises a light source, and the method comprises selectively illuminating the light source to transmit the configuration data signal.

5. A method according to claim 4, wherein the configuration data signal comprises a number, and the selective illumination of the light source comprises encoding the number into an illumination sequence representing individual digits of the number.

6. The method according to claim 1, comprising, when the first input is not received, and prior to transmitting, by the untrusted device, the second configuration data to the second tire monitoring device, re-attempting verification of the first configuration data, and indicating a fault condition if the first input continues not to be received.

7. The method according to claim 6, comprising, when the first input continues not to be received after re-attempting verification of the first configuration data, re-transmitting, by the untrusted device, the first configuration data to the first tire monitoring device, re-attempting verification of the first configuration data after the re-transmitting, and indicating a further fault condition if the first input still continues not to be received.

8. The method according to claim 1, wherein the method comprises transmitting, via the untrusted device, a further command waking the first tire monitoring device prior to transmission of the first configuration data to the first tire monitoring device.

9. The method according to claim 8, wherein the command is transmitted using a relatively long-range communication protocol, and the further command is transmitted using a relatively short-range communication protocol.

10. A tire monitoring network comprising first and second tire monitoring devices configured by a method according to claim 1.

11. An aircraft comprising the tire monitoring network according to claim 10.

12. The method according to claim 1, wherein the first and/or second configuration data comprises any of an aircraft wheel location at which the tire monitoring device is intended to be located, and a reference pressure for a tire of a wheel to which the tire monitoring device corresponds.

13. The method according to claim 1, wherein the method comprises receiving, at the untrusted device, the first configuration data prior to transmitting the first configuration data to the first tire monitoring device.

14. The method according to claim 1, wherein the method comprises initiating, via the untrusted device, a tire check once secure future communication is established between the first and second tire monitoring devices.

15. The method according to claim 1, wherein the method comprises:
transmitting, by the untrusted device, third configuration data to a third tire monitoring device;

receiving, by the untrusted device, a third input verifying that the third configuration data has been loaded to the third tire monitoring device and matches expected third configuration data; and
after receipt of the first, second and third inputs, transmitting, by the untrusted device, the command initializing generation of the cryptographic parameter by the first tire monitoring device, and causing the cryptographic parameter to be exchanged with the second and third tire monitoring devices such that secure future communication is established between the first, second and third tire monitoring devices.

16. The method according to claim 1, wherein the tire monitoring devices comprise tire pressure monitoring devices.

17. A method of configuring a network of tire pressure monitoring devices using an untrusted device, the method comprising:
transmitting, by the untrusted device, respective configuration data to the tire pressure monitoring devices;
receiving, by the untrusted device, respective inputs verifying that installed configuration data matches expected configuration data; and
after receiving the respective inputs, transmitting, by the untrusted device, a command initializing generation of a cryptographic parameter by at least one of the tire pressure monitoring devices, and causing the cryptographic parameter to be exchanged with the other tire pressure monitoring devices such that secure future communication is established between the tire pressure monitoring devices,
wherein the tire pressure monitoring devices are installed with the respective configuration data, and respective inputs verifying that the installed configuration data matches expected configuration data are received by the untrusted device, sequentially prior to transmission of the command, with configuration data transmitted to a tire pressure monitoring device and verified via the respective input prior to transmission of configuration data to a next sequential tire pressure monitoring device.

18. A tire monitoring network comprising first and second tire monitoring devices configured by a method according to claim 17.

19. An aircraft comprising the tire monitoring network according to claim 18.

* * * * *